(12) United States Patent
Abouraddy et al.

(10) Patent No.: US 12,037,710 B2
(45) Date of Patent: Jul. 16, 2024

(54) FIBERS HAVING ELECTRICALLY CONDUCTIVE CORE AND COLOR-CHANGING COATING

(71) Applicant: UNIVERSITY OF CENTRAL FLORIDA RESEARCH FOUNDATION, INC., Orlando, FL (US)

(72) Inventors: Ayman Abouraddy, Orlando, FL (US); Joshua Kaufman, Orlando, FL (US); Felix Tan, Orlando, FL (US); Morgan Monroe, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 624 days.

(21) Appl. No.: 16/846,834

(22) Filed: Apr. 13, 2020

(65) Prior Publication Data

US 2020/0240041 A1 Jul. 30, 2020

Related U.S. Application Data

(63) Continuation of application No. PCT/US2018/056323, filed on Oct. 17, 2018.
(Continued)

(51) Int. Cl.
*D01D 11/06* (2006.01)
*C09K 9/02* (2006.01)
(Continued)

(52) U.S. Cl.
CPC ............. *D01D 11/06* (2013.01); *C09K 9/02* (2013.01); *D01D 5/32* (2013.01); *D01F 1/04* (2013.01);
(Continued)

(58) Field of Classification Search
CPC .. D01D 5/32; D01D 11/06; D01F 1/04; D01F 8/04
See application file for complete search history.

(56) References Cited

U.S. PATENT DOCUMENTS 2,936,482 A * 5/1960 Kilian ...................... D01D 5/34
57/248
2,989,798 A * 6/1961 Bannerman ........... B29C 48/304
428/394
(Continued)

FOREIGN PATENT DOCUMENTS

CN 1898421 A 1/2007
DE 10 2009 052 848 A1 5/2011
(Continued)

OTHER PUBLICATIONS

Machine translation of WO2014020266A1 from Google Patents, 9 pages. (Year: 2022).*
(Continued)

*Primary Examiner* — Emmanuel S Luk
(74) *Attorney, Agent, or Firm* — FOLEY & LARDNER LLP

(57) ABSTRACT

A method of manufacturing a color-changing fiber includes loading a polymeric material and a thermochromic pigment material into a fiber fabrication machine that comprises an extruder and a spinneret, operating the extruder to provide a molten mixture of the polymeric material and the thermochromic pigment material, providing a volume of the molten mixture to the spinneret, and operating the spinneret to coat an electrically conductive core with the molten mixture to form a coating layer around the electrically conductive core to produce the color-changing fiber. The polymeric material and the thermochromic pigment material are provided as (a) a first raw material comprising the polymeric material and a second raw material comprising
(Continued)

the thermochromic pigment material or (b) a thermochromic pigment and polymer mixture.

17 Claims, 21 Drawing Sheets

Related U.S. Application Data

(60) Provisional application No. 62/671,966, filed on May 15, 2018, provisional application No. 62/581,425, filed on Nov. 3, 2017, provisional application No. 62/573,861, filed on Oct. 18, 2017.

(51) Int. Cl.
*D01D 5/32* (2006.01)
*D01F 1/04* (2006.01)
*D01F 8/04* (2006.01)
*G02F 1/01* (2006.01)
*A41D 1/00* (2018.01)
*A41D 1/22* (2018.01)
*A43B 3/34* (2022.01)

(52) U.S. Cl.
CPC .............. *D01F 8/04* (2013.01); *G02F 1/0147* (2013.01); *A41D 1/002* (2013.01); *A41D 1/22* (2013.01); *A43B 3/34* (2022.01)

(56) References Cited

U.S. PATENT DOCUMENTS

| | | | | |
|---|---|---|---|---|
| 3,217,734 | A | | 11/1965 | Fitzgerald |
| 4,059,949 | A | * | 11/1977 | Lee ........................... D01D 5/34 442/311 |
| 4,085,182 | A | * | 4/1978 | Kato ......................... D01F 8/12 264/105 |
| 4,851,282 | A | * | 7/1989 | Shimizu ................... D06Q 1/00 428/407 |
| 5,110,998 | A | * | 5/1992 | Muschiatti .............. H01B 11/12 174/26 G |
| 5,277,976 | A | * | 1/1994 | Hogle .................... D01D 5/253 428/397 |
| 5,281,208 | A | * | 1/1994 | Thompson ............. A61F 13/514 604/383 |
| 5,405,682 | A | * | 4/1995 | Shawyer ................... D04H 3/14 428/221 |
| 5,753,381 | A | * | 5/1998 | Feldman ................ D02G 3/441 313/511 |
| 5,827,611 | A | * | 10/1998 | Forbes ...................... D01D 5/34 428/374 |
| 5,906,004 | A | * | 5/1999 | Lebby ..................... D02G 3/441 2/905 |
| 6,069,435 | A | * | 5/2000 | Amey, Jr. ................ H01J 9/022 445/24 |
| 6,096,666 | A | * | 8/2000 | Jachimowicz ......... D02G 3/346 139/420 R |
| 6,200,669 | B1 | * | 3/2001 | Marmon ................... D01F 8/12 442/350 |
| 6,607,157 | B1 | * | 8/2003 | Duescher ............... B65H 27/00 242/417.3 |
| 6,710,242 | B1 | * | 3/2004 | Iguro ........................ D01F 8/12 428/372 |
| 7,164,820 | B2 | * | 1/2007 | Eves ...................... G02F 1/0115 385/39 |
| 9,182,561 | B2 | | 11/2015 | Bauco |
| 11,365,493 | B2 | * | 6/2022 | Zhou ......................... D01D 5/06 |
| 2001/0045677 | A1 | * | 11/2001 | Kang ........................ D01F 1/10 264/28 |
| 2002/0046795 | A1 | * | 4/2002 | Billieres ................... B60C 9/08 156/131 |
| 2002/0090510 | A1 | * | 7/2002 | Ono ................... D04H 1/43825 428/375 |
| 2002/0114598 | A1 | * | 8/2002 | Bodaghi ................. B29C 48/91 264/1.24 |
| 2003/0194578 | A1 | * | 10/2003 | Tam ....................... D21H 21/48 428/323 |
| 2003/0224155 | A1 | | 12/2003 | Orth et al. |
| 2006/0000766 | A1 | * | 1/2006 | Ji ........................... B01D 69/087 427/245 |
| 2006/0081639 | A1 | | 4/2006 | Lazaroff et al. |
| 2007/0195546 | A1 | | 8/2007 | Den Toonder et al. |
| 2007/0273951 | A1 | | 11/2007 | Ribi |
| 2008/0092599 | A1 | | 4/2008 | Hazan et al. |
| 2008/0170982 | A1 | * | 7/2008 | Zhang ................... H01L 51/444 423/447.3 |
| 2008/0233379 | A1 | | 9/2008 | O'Connor |
| 2009/0065969 | A1 | | 3/2009 | Perera et al. |
| 2009/0085444 | A1 | * | 4/2009 | Alvarez Icaza Rivera ................. H02N 11/006 310/365 |
| 2009/0105796 | A1 | * | 4/2009 | Atanasoska .......... A61N 1/0565 607/152 |
| 2009/0133922 | A1 | | 5/2009 | Okazaki et al. |
| 2009/0260848 | A1 | * | 10/2009 | Perera .................... H01B 3/426 977/762 |
| 2009/0302237 | A1 | | 12/2009 | Bortz et al. |
| 2010/0003496 | A1 | * | 1/2010 | Dias ...................... A41D 27/085 87/8 |
| 2010/0029161 | A1 | * | 2/2010 | Pourdeyhimi ........... D01D 5/34 442/337 |
| 2010/0089607 | A1 | | 4/2010 | Nakamura et al. |
| 2010/0315755 | A1 | | 12/2010 | Gavin |
| 2011/0109611 | A1 | | 5/2011 | Nakamura |
| 2011/0217544 | A1 | | 9/2011 | Young et al. |
| 2012/0030935 | A1 | * | 2/2012 | Slade ..................... H01R 12/61 29/825 |
| 2012/0077403 | A1 | | 3/2012 | Gaillard et al. |
| 2012/0097194 | A1 | * | 4/2012 | McDaniel .............. A01N 63/50 435/197 |
| 2012/0148797 | A1 | | 6/2012 | Tsai |
| 2012/0211156 | A1 | | 8/2012 | Harvey et al. |
| 2012/0231690 | A1 | * | 9/2012 | Pourdeyhimi ........... D04H 3/11 442/337 |
| 2013/0033378 | A1 | | 2/2013 | Donovan et al. |
| 2014/0113813 | A1 | | 4/2014 | Kwan |
| 2014/0170920 | A1 | | 6/2014 | Manipatruni et al. |
| 2014/0329058 | A1 | | 11/2014 | Lin |
| 2014/0366238 | A1 | | 12/2014 | Owen et al. |
| 2015/0088027 | A1 | * | 3/2015 | Cranston ................ D01D 11/06 374/162 |
| 2015/0191607 | A1 | * | 7/2015 | McDaniel ............ C09D 5/1625 424/94.64 |
| 2015/0275404 | A1 | * | 10/2015 | Erlandsson ............... D01F 8/04 442/364 |
| 2016/0053169 | A1 | * | 2/2016 | Kunath .................. D21H 21/48 252/301.6 F |
| 2016/0168759 | A1 | * | 6/2016 | Grassi .................... C08G 69/48 428/221 |
| 2016/0174650 | A1 | | 6/2016 | Donovan et al. |
| 2016/0178454 | A1 | | 6/2016 | Savaria et al. |
| 2016/0194788 | A1 | * | 7/2016 | Tanaka ..................... D01F 8/14 428/373 |
| 2016/0223878 | A1 | | 8/2016 | Tran et al. |
| 2017/0029991 | A1 | | 2/2017 | Chandrasekaran et al. |
| 2017/0058451 | A1 | * | 3/2017 | Smith .................... D06M 23/08 |
| 2018/0240396 | A1 | * | 8/2018 | Fontecchio .......... G09G 3/2003 |
| 2018/0271180 | A1 | | 9/2018 | Kim et al. |
| 2018/0271188 | A1 | | 9/2018 | Matheny et al. |
| 2018/0364518 | A1 | * | 12/2018 | Paolini, Jr. ................ D01F 6/64 |
| 2019/0040562 | A1 | | 2/2019 | Moon |
| 2019/0064623 | A1 | | 2/2019 | Gillaspie et al. |
| 2019/0071799 | A1 | * | 3/2019 | Zhou ......................... D01D 5/08 |
| 2019/0078237 | A1 | * | 3/2019 | Jeong .................... D06P 1/5292 |
| 2019/0112733 | A1 | * | 4/2019 | Abouraddy ............... D01F 6/54 |
| 2019/0153630 | A1 | * | 5/2019 | Zhou ......................... D01F 8/14 |
| 2020/0024774 | A1 | * | 1/2020 | Yasutomo .............. D01D 5/253 |
| 2020/0029899 | A1 | | 1/2020 | Bogdanovich et al. |
| 2020/0063296 | A1 | * | 2/2020 | Ozden ...................... D02G 3/12 |

(56) References Cited

U.S. PATENT DOCUMENTS

| | | | |
|---|---|---|---|
| 2020/0103720 A1 | | 4/2020 | Anseth et al. |
| 2020/0283931 A1 | | 9/2020 | Abouraddy et al. |
| 2022/0372663 A1 | * | 11/2022 | Ino .................. C09K 21/14 |

FOREIGN PATENT DOCUMENTS

| | | | | | |
|---|---|---|---|---|---|
| EP | 1221500 A1 | * | 7/2002 | ............... | D01F 1/04 |
| FR | 2993888 A1 | * | 1/2014 | ............... | C08J 5/18 |
| GB | 2464533 A | | 4/2010 | | |
| JP | 2826134 B2 | | 3/1991 | | |
| JP | H04-122620 A | | 4/1992 | | |
| JP | H11-195329 A | | 7/1999 | | |
| JP | 3110521 B2 | | 11/2000 | | |
| JP | H02-041415 A | | 2/2002 | | |
| JP | 2004-137614 A | | 5/2004 | | |
| JP | 2004137614 A | * | 5/2004 | | |
| JP | 2007-521420 A | | 8/2007 | | |
| JP | H09-059823 A | | 3/2009 | | |
| JP | 2010-522283 A | | 7/2010 | | |
| JP | H11-053969 A | | 3/2011 | | |
| JP | 2012-500865 A | | 1/2012 | | |
| JP | 2012-528253 A | | 11/2012 | | |
| JP | 2013-529504 A | | 7/2013 | | |
| KR | 100901133 B1 | * | 6/2009 | | |
| KR | 20120017436 | | 2/2012 | | |
| KR | 101541214 B1 | * | 8/2015 | | |
| WO | WO-97/27360 A1 | | 7/1997 | | |
| WO | WO-2005/096075 A1 | | 10/2005 | | |
| WO | WO-2006/123133 A1 | | 11/2006 | | |
| WO | WO-2014/020266 A1 | | 2/2014 | | |
| WO | WO-2014020266 A1 | * | 2/2014 | ............... | C08J 5/18 |

OTHER PUBLICATIONS

Final Office Action on U.S. Appl. No. 16/163,307 dated Jan. 6, 2022.
Foreign Action other than Search Report on CN 201880081397.8 dated Dec. 1, 2021.
Foreign Action other than Search Report on JP 2020-542537 dated Jan. 5, 2022.
Non-Final Office Action on U.S. Appl. No. 16/163,307 dated Aug. 22, 2022.
Teamlogo .com ("Custom Imprint and Embroidery"). Website: https ://web .archiveorg/web/20140701115135/https://teamlogo .com/inc/sdetail/988/991. Jul. 1, 2014. (Year: 2014).
Laforgue et al., "Multifunctional Resistive-Heating and Color-Changing Monofilaments Produced by a Single-Step Coaxial Melt-Spinning Process," ACS Appl. Mater. Interfaces 2020, 4 pages.
Li, Qiang et al., "Reduced graphene oxide functionalized stretchable and multicolor electrothermal chromatic fibers,", Journal of Materials Chemistry C, 2017, 6 pages.
International Search Report and Written Opinion, PCT/US2018/056323, University of Central Florida Research Foundation, Inc., 8 pages (dated Jan. 2, 2019).
European Search Report received for EP Application No. 18869173.7 dated Jun. 14, 2021, 8 pages.
International Preliminary Report on Patentability on PCT Appl. Ser. No. PCT/US2018/056323 dated Apr. 30, 2020 (6 pages).
Japanese Office Action and English Translation Received for application No. 2020-542537 dated Jun. 15, 2021, 6 pages.
KR Office Action on KR Appl. Ser. No. 10-2020-7013654 dated May 28, 2021 (11 pages).
Preliminary Rejection on KR Patent Application No. 10-2020-7013654 dated May 28, 2021 11 pages.
PCT International Search Report and Written Opinion for International Application No. PCT/US2021/033211 dated Aug. 25, 2021, 11 pages.
PCT International Search Report and Written Opinion for International Application No. PCT/US2021/033212 dated Sep. 8, 2021, 9 pages.
PCT International Search Report and Written Opinion for International Application No. PCT/US2021/033216 dated Sep. 10, 2021, 12 pages.

* cited by examiner

Fabric Edge

Coating Removal Fabric Edge

Core Connections

Electrical Connections

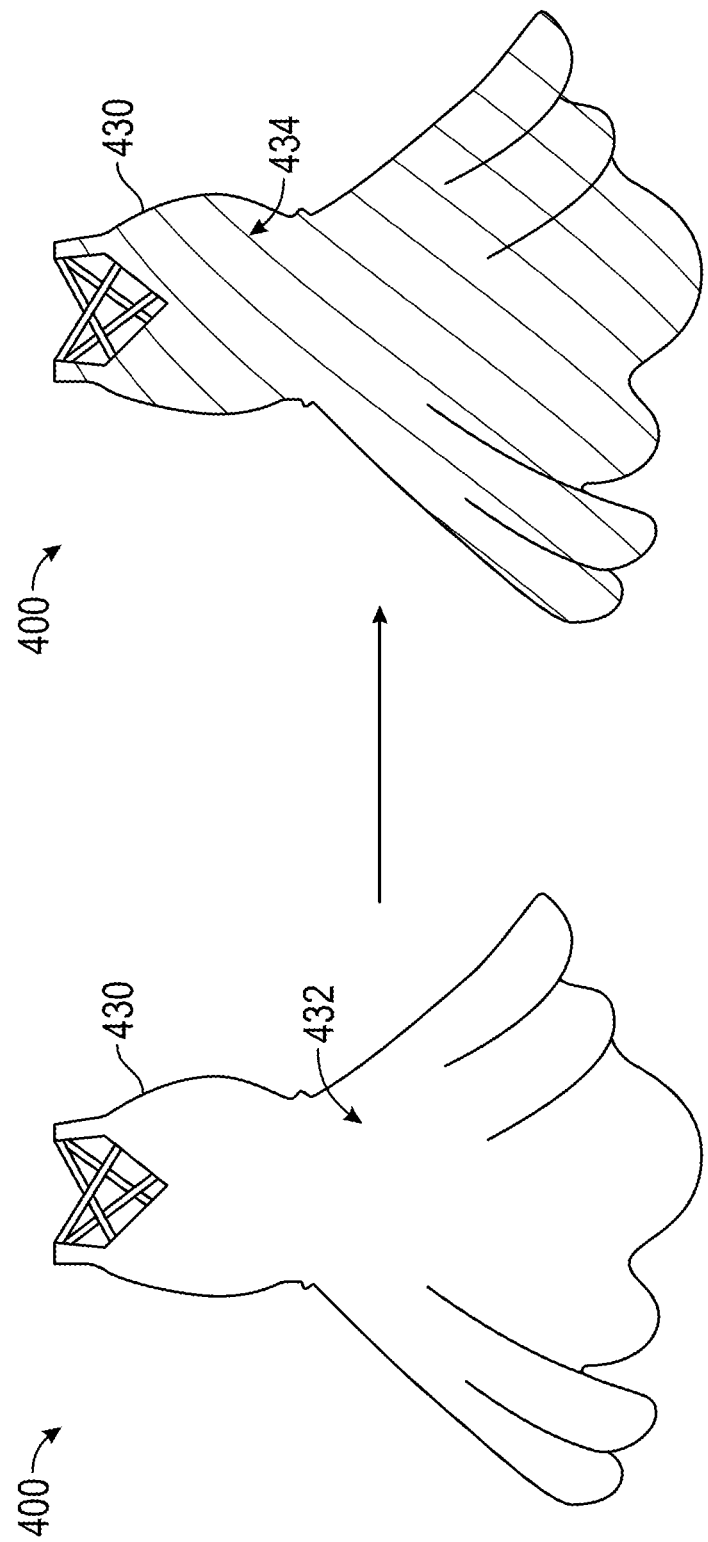

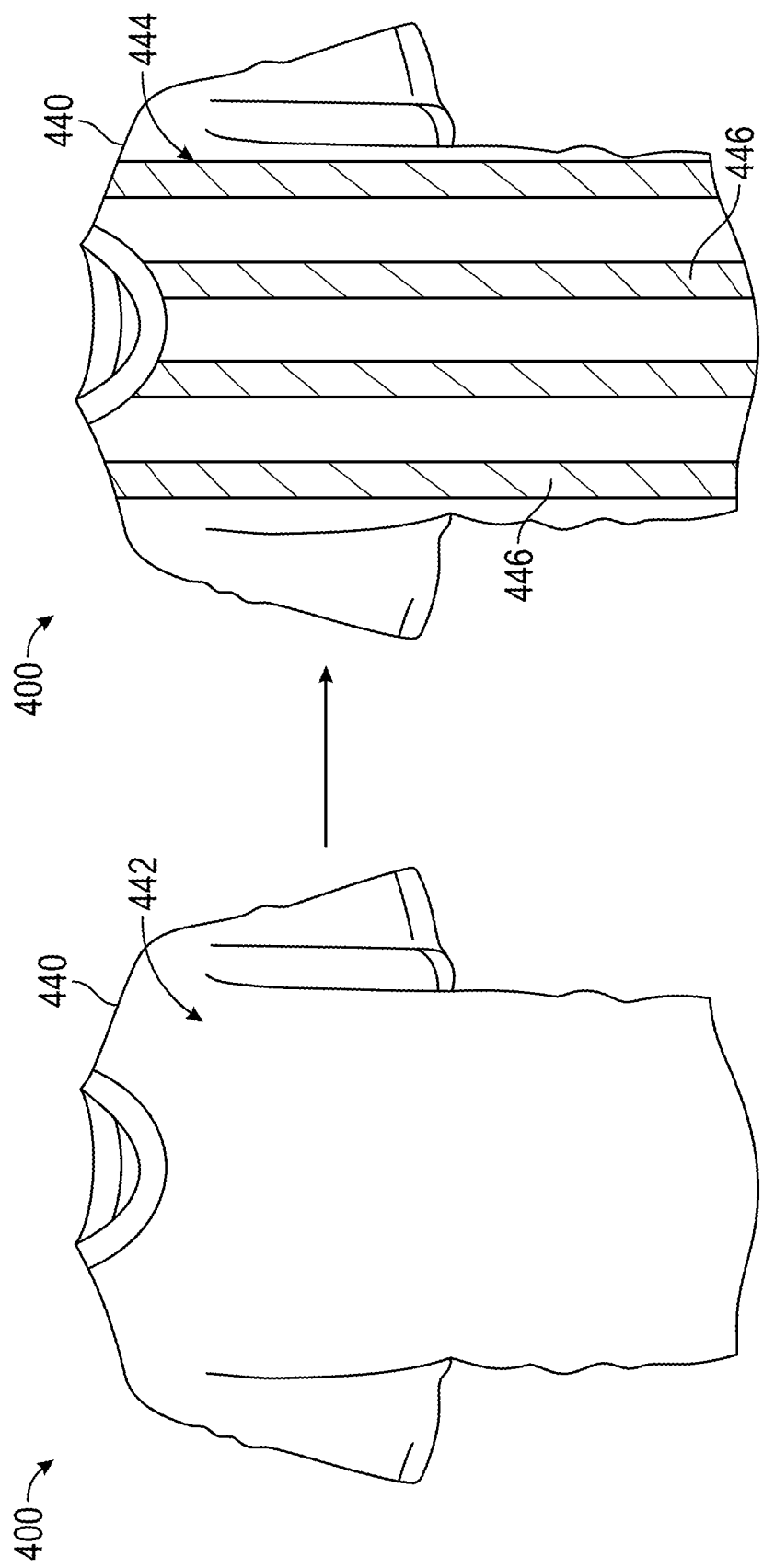

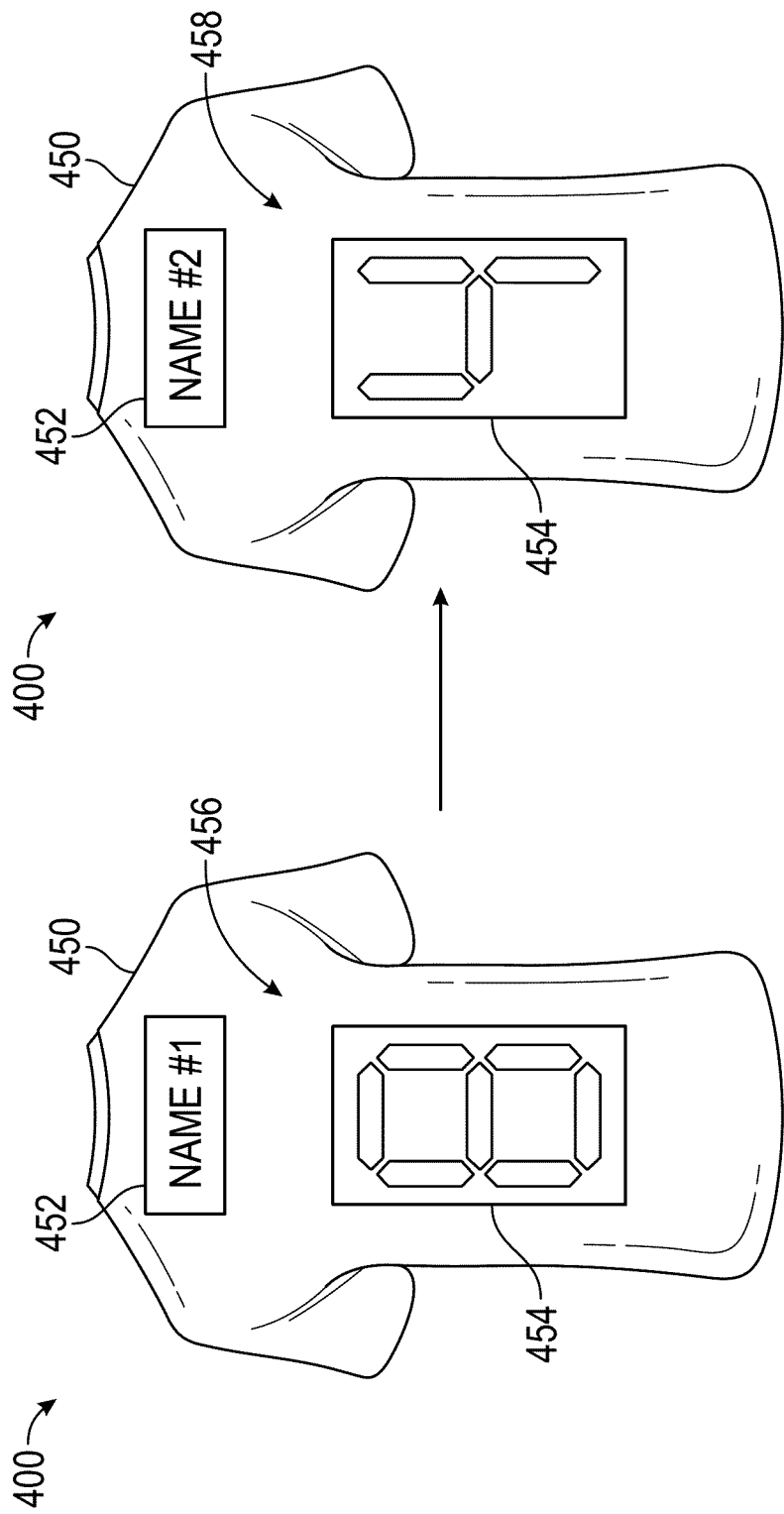

FIBERS HAVING ELECTRICALLY CONDUCTIVE CORE AND COLOR-CHANGING COATING

CROSS-REFERENCE TO RELATED PATENT APPLICATIONS

This application is a Continuation of International Patent Application No. PCT/US2018/056323, filed Oct. 17, 2018, which claims the benefit of and priority to U.S. Provisional Patent Application No. 62/573,861, filed Oct. 18, 2017, U.S. Provisional Patent Application No. 62/581,425, filed Nov. 3, 2017, and U.S. Provisional Patent Application No. 62/671,966, filed May 15, 2018, all of which are incorporated herein by reference in their entireties.

BACKGROUND

Thermochromic pigments change color in response to a thermal stimulus (e.g., as they change temperature, etc.). Thermochromic pigments may include liquid crystals, while other thermochromic pigments may use organic dyes (e.g., carbon-based dyes, etc.) known as leucodyes. Leucodyes are (i) optically transparent or have a particular color at a first temperature and (ii) become visible or change to a different color at a second temperature. Such a change is evident to an observer as the temperature rises or falls. Leucodyes are organic chemicals that change color when heat energy makes their molecules shift back and forth between two subtly differently structures, known as the leuco (colorless) and non-leuco (colored) forms. Thermochromic liquid crystals may shift color up and down the visible spectrum as they get hotter or colder, while leucodyes may be mixed in various ways to produce different kinds of color-changing effects at a wide range of temperatures.

SUMMARY

One embodiment relates to a method of manufacturing a color-changing fiber. The method includes loading a polymeric material and a thermochromic pigment material into a fiber fabrication machine that comprises an extruder and a spinneret, operating the extruder to provide a molten mixture of the polymeric material and the thermochromic pigment material, providing a volume of the molten mixture to the spinneret, and operating the spinneret to coat an electrically conductive core with the molten mixture to form a coating layer around the electrically conductive core to produce the color-changing fiber. The polymeric material and the thermochromic pigment material are provided as (a) a first raw material comprising the polymeric material and a second raw material comprising the thermochromic pigment material or (b) a thermochromic pigment and polymer mixture.

Another embodiment relates to a method for manufacturing a color-changing product. The method includes providing a fabric or a product including the fabric; providing a color-changing fiber or a color-changing yarn including the color-changing fiber where (a) the color-changing fiber includes (i) an electrically conductive core and (ii) a coating disposed around the electrically conductive core and (b) the coating includes a thermochromic pigment; embroidering the color-changing fiber or the color-changing yarn to a portion of the fabric; electrically connecting the electrically conductive core to a power source where the power source is configured to facilitate selectively providing an electrical current to the electrically conductive core to activate the thermochromic pigment within the coating of the color-changing fiber; and connecting a controller to the power source. The controller is configured to provide the electrical current from the power source to the electrically conductive core in response to receiving an input from an input device. The controller is electrically connected to or wirelessly connectable to the input device.

Still another embodiment relates to a color-changing product. The color changing product includes a fabric, a power source, and a controller. At least a portion of the fabric includes or is arranged using at least one of (i) a color-changing fiber or (ii) a color-changing yarn including the color-changing fiber. The color-changing fiber includes (i) an electrically conductive core and (ii) a coating disposed around the electrically conductive core. The coating includes a thermochromic pigment. The power source is configured to provide electrical current to the electrically conductive core to activate the thermochromic pigment to cause a color-change to the portion of the fabric. The controller is configured to selectively activate the power source in response to receiving an input from an input device. The controller is electrically connected to or wirelessly connectable to the input device.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 23 and 24 show a first color-changing product in a first state and a second state, according to an exemplary embodiment.

FIGS. 25 and 26 show a second color-changing product in a first state and a second state, according to an exemplary embodiment.

FIGS. 27 and 28 show a third color-changing product having a patch in a first state and a second state, according to an exemplary embodiment.

DETAILED DESCRIPTION

Figure 1:
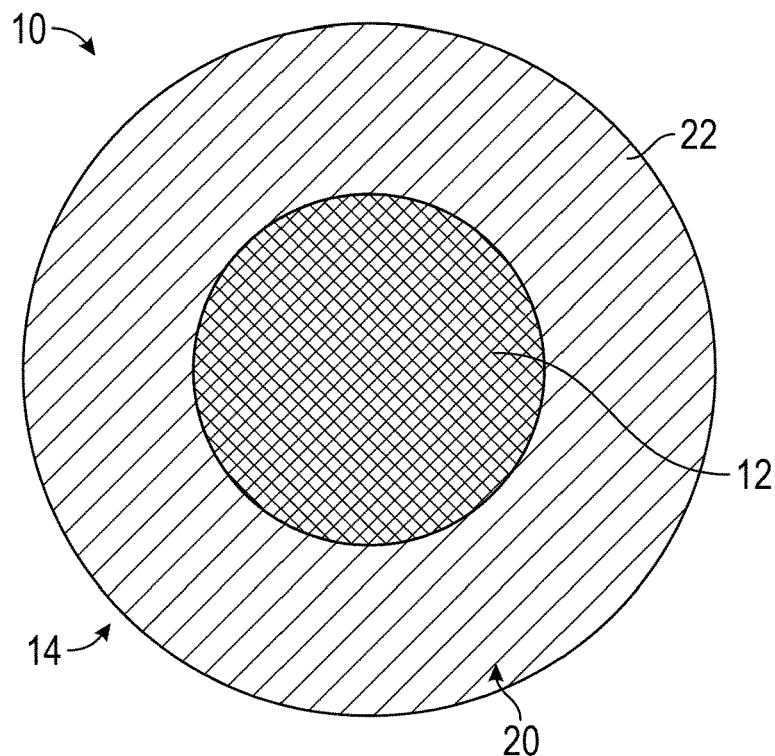
FIG. 1 is a cross-sectional view of a color-changing monofilament, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

The present disclosure is generally directed to the field of fabric technology and, more particularly, is directed to fibers, yarns, and fabrics having an on-demand (e.g., active, dynamic, selectively controllable, etc.) color-changing capability. According to an exemplary embodiment, a color-changing monofilament (e.g., a filament, a strand, a fiber, etc.), which is optionally formed (e.g., combined, twisted, braided, etc.) into a multifilament (e.g., yarn, thread, etc.), is configured to be either (i) incorporated into (e.g., stitched into, sewn into, embroidered into, integrated into, coupled to via a patch, etc.) an existing product or (ii) arranged (e.g., knit, woven, etc.) to form a new product. The color-changing monofilament includes at least one conductive core (e.g., an electrically conductive core, a thermally conductive core, a multi-core, etc.) and a color-changing coating disposed around and along the at least one conductive core. The color-changing coating includes one or more layers (e.g., one, two, three, four, etc.). Each of the one or more layers has one or more different color-changing portions or segments having a respective thermochromic pigment. An electrical current provided to the conductive core, and thereby the temperature of the conductive core, is selectively controllable to actively and dynamically adjust the color of the color-changing coating.

Current fabric products having appearance and color-changing capabilities are passively controlled in response to environmental stimuli (e.g., sunlight, body heat, etc.). By way of example, photochromic dyes may be used in prints on clothing that change color in sunlight. By way of another example, thermochromic dyes may be used to passively change the color of a fabric through body heat and/or ambient heat. Advantageously, the color-changing monofilament of the present disclosure facilitates dynamically changing one or more visual characteristics of a fabric or product on-demand.

According to various exemplary embodiments, the color-changing monofilament is capable of being incorporated into or arranged to form (i) apparel such as headbands, wristbands, ties, bowties, shirts, jerseys, gloves, scarves, jackets, pants, shorts, dresses, skirts, blouses, footwear/shoes, belts, hats, etc.; (ii) accessories such as purses, backpacks, luggage, wallets, jewelry, hair accessories, etc.; (iii) home goods, décor, and fixed installations such as curtains, window blinds, furniture and furniture accessories, table cloths, blankets, bed sheets, pillow cases, rugs, wall paper, art/paintings, automotive interiors, etc.; (iv) outdoor applications and equipment such as tents, awnings, umbrellas, canopies, signage, etc.; and/or (v) still other suitable applications. Further applications may include camouflage (e.g., military camouflage, hunting camouflage, etc.), which may be dynamically (e.g., selectively, adaptively, etc.) changed to suit daytime, nighttime, season, desert locations, snow locations, forest locations, urban locations, and/or other environmental conditions.

Color-Changing Fiber

According to the various exemplary embodiments shown in FIGS. 1-7, a color-changing monofilament (e.g., a filament, a fiber, a strand, etc.), shown as color-changing fiber 10, includes a conductive core, shown as core 12, and a color-changing coating (e.g., sheath, cover, casing, etc.), shown as coating 14, disposed around and along the core 12 such that the core 12 is embedded within the coating 14. According to an exemplary embodiment, the core 12 is manufactured from an electrically conductive material. In one embodiment, the core 12 is manufactured from a metal or metal alloy. By way of example, the core 12 may be manufactured from copper, nickel, aluminum, zinc, silver, gold, titanium, tungsten, molybdenum, chromium, platinum, palladium, combinations thereof, and/or another suitable metal or metal alloy. In other embodiments, the core 12 is manufactured from a non-metallic, electrically conductive material. By way of example, the core 12 may be manufactured from a heavily doped semiconductor, a polymer doped with a conductive phase (e.g., an electrically conductive (conjugated) polymer, etc.), and/or carbon phases (e.g., graphite, graphene, carbon nanofibers, carbon nanowires, etc.). In some embodiments, the core 12 includes electrically conductive contacts manufactured from a metallic material that is different than the material of the core 12. In such embodiments, the core 12 itself may or may not be conductive (e.g., a plastic core, any flexible core capable of being woven, etc.). According to an exemplary embodiment, the color-changing fibers 10 are flexible to permit weaving and knitting and durable as textile fibers such that the resultant end product is launderable (i.e., capable of being washed or laundered).

According to an exemplary embodiment, the color-changing fiber 10 has dimensions (e.g., diameter, etc.) suitable for weaving in an industrial loom. By way of example, the transverse dimensions (e.g., diameter, width, etc.) of the color-changing fiber 10 and/or a multifilament fiber (e.g., thread, yarn, etc.) formed therefrom may generally be less than 1 millimeter. In some embodiments, the transverse dimensions are less than 600 micrometers. In some embodiments, the transverse dimensions are less than 40 micrometers. In some embodiments, the transverse dimensions are in a range from 15 micrometers to 30 micrometers. The diameter of the core 12 may range between 1 micrometer and 500 micrometers. The internal cross-sectional structure of the color-changing fiber 10 may have many variations from, for example, a single core with a cladding coating, a multi-core within a cladding coating, a single core with concentric ring coating layers, a single core with a multi-segment coating in the azimuthal direction, combinations thereof, etc. Further, while the color-changing fiber 10 is shown in FIGS. 1-7 to have a circular cross-sectional shape, in other embodiments, the color-changing fiber 10 has a different cross-sectional shape (e.g., square, triangular, rectangular, etc.). In such embodiments, the core 12 may have a circular cross-sectional shape or may have another shape that corresponds with the cross-sectional shape of the coating 14.

According to an exemplary embodiment, the coating 14 includes one or more layers of polymeric material (e.g., a polymer, a polymer composite, a polymer with polycrystalline material, Hytrel, cyclic olefin copolymer, polypropylene, nylon, polyester, etc.). At least one of the one or more layers of polymeric material includes a reversible thermochromic pigment combined (e.g., mixed, compounded, impregnated, etc.) therewith such that the respective layer changes color in response to a temperature change thereof (e.g., the thermochromic pigment transitions from a first color to a second color when heated and transitions from the second color to the first color when cooled, etc.) and/or (ii) in response to an electrical current being provided to the core 12. Generally, any suitable reversible thermochromic pigment composition may be used. For example, the thermochromic pigment may include a liquid crystal material and/or a leucodye. In one embodiment, the coating 14 includes a single layer of polymeric material. In another embodiment, the coating 14 includes a plurality of concentric layers of polymeric material. In some embodiments, each of the plurality of concentric layers of polymeric material includes a respective thermochromic pigment. In some embodiments, at least one of the plurality of layers of polymeric material does not include a thermochromic pigment, but rather the pigment of the at least one polymeric material is substantially fixed and does not change (due to temperature or electrical current). The material of the coating 14 may be appropriately chosen for its properties based on the specific application for the color-changing fiber 10.

In operation, an electrical current (e.g., provided by a power source such as a battery, a solar panel, a photovoltaic fiber, etc. for portable applications; provided by a power source such as battery, a solar panel, a photovoltaic fiber, a mains power supply, a standard wall socket, etc. for fixed installations; etc.) is passed through the core 12. The resistance of the core 12 to the electrical current causes the temperature of the core 12 to elevate and thereby heat and activate the thermochromic pigment of the coating 14 to transition the color thereof from a first color to a second color (e.g., from a darker color to a lighter color, from one opaque color to a different opaque color, from opaque to transparent, or the like when a temperature transition threshold is reached). The color-changing fiber 10 may operate at low voltages (e.g., 12 volts or less, etc.). By way of example, the core 12 may be selected so that the current drawn from the power source is about 1 ampere, which then for a 5 volt DC power means the core 12 should have a resistance of about 5 ohms. In some embodiments, the color-changing fiber 10 transitions from the first color to the second color in 10s or 100s of milliseconds (e.g., depending on the amount of power applied, etc.). In some embodiments, the transition may be extended to seconds or even minutes to reduce energy consumption.

The color-changing fiber 10 may remain continuously biased at the second color and thus retain the second color until the user decides to remove the applied power to enable transitioning the color of the coating 14 back to the first color. In some embodiments, removing the electrical current results in the coating 14 transitioning from the second color back to the first color. The coating 14 may remain at the second color for several seconds or minutes following the removal of the electrical current. The transition time from the second color back to the first color may depend on the environmental temperature (e.g., body temperature of the person, temperature of the ambient environment, etc.) and the temperature at which the thermochromic pigment activates/deactivates (e.g., the temperature transition threshold, etc.).

In some embodiments, removing the electrical current does not result in the coating 14 transitioning from the second color back to the first color. By way of example, the temperature at which the thermochromic pigment returns to the first color may be below the environmental temperature. In such a case, removing the electrical current does not result in the color transitioning from the second color back to the first color. Rather, in such embodiments, the color of the coating 14 may remain fixed until extra cooling is applied to the color-changing fiber 10 to change the color back to the first color. By way of another example, the coating 14 may include a respective thermochromic pigment that exhibits thermal hysteresis in its photo-thermal behavior. For example, once the respective thermochromic pigment reaches its temperature transition threshold, the color thereof transitions. However, the coating 14 may retain the new color even when the temperature drops below the temperature transition threshold. In such a case, the respective thermochromic pigment may need to be brought to a temperature lower than the temperature transition threshold to return to its original color (e.g., 5, 10, 15, etc. degrees lower than the temperature transition threshold, etc.). Such an asymmetric transition capability may advantageously assist in reducing the electrical power needed for maintaining the second color of the coating 14 following the transition from the original, first color of the coating 14 to the second color.

According to an exemplary embodiment, impregnating or otherwise mixing the material of the coating 14 with one or more thermochromic pigments facilitates controlling the optical properties of the resultant fabric or other end product that the color-changing fiber 10 is incorporated into. By way of example, changing the pigment concentration may yield a variety of dynamically controllable optical effects, such as transitioning from one solid color to another, transitioning from a solid color to a semi-transparent sheer effect, transitioning from a solid color to transparent or substantially transparent, etc. By way of another example, the selection of the type and concentration of the pigments within the material of the coating 14 may be specifically tailored to suit each individual application in order to provide a desired original color and transition color, optimize the transition temperature, provide a desired transition time, and/or minimize power consumption required to perform and/or maintain the transition.

In some embodiments, the color-changing fiber 10 includes phosphor (e.g., within the coating 14, disposed between the core 12 and the coating 14, in an independent coating layer, etc.). The phosphor may facilitate providing a color-changing fiber 10 with a selectively controllable "glow-in-the-dark" effect. By way of example, if the coating 14 transitions to a transparent state from an opaque state, with the phosphor disposed underneath the coating, the phosphor may glow through the coating 14 when in the transparent state to provide a luminescent fiber. By way of another example, if the coating 14 includes phosphor, the phosphor may "glow" as an electrical current is provided to the color-changing fiber 10.

As shown in FIG. 1, the coating 14 of the color-changing fiber 10 includes a first layer (e.g., a single layer, etc.), shown as layer 20, disposed around and along the core 12. The layer 20 includes a first material, shown as material 22. The material 22 may include a respective polymer or polymer composite that includes a respective thermochromic pigment. The material 22 may transition from a first color (e.g., a relatively darker color, purple, green, etc.) to a second color (e.g., a relatively lighter color, red, yellow, etc.) at a first temperature transition threshold. The first temperature transition threshold may be dependent on (i) the respective polymer or polymer composite, (ii) the respective thermochromic pigment, and/or (iii) the concentration of the respective thermochromic pigment. The first temperature transition threshold may be designed to be at a temperature between about 0 degrees Celsius and about 70 degrees Celsius. The temperature transition threshold may be selected based on the intended application of the end product including the color-changing fibers 10. By way of example, the temperature transition threshold may be about 0 degrees Celsius (e.g., between −15 and 15 degrees Celsius, etc.) for a garment intended for an outdoor winter application. By way another of example, the temperature transition threshold may be about 27 degrees Celsius (e.g., between 15 and 30 degrees Celsius, etc.) for a garment intended for an indoor application. By way of yet another example, the temperature transition threshold may be about 38 degrees Celsius (e.g., between 30 and 45 degrees Celsius, etc.) for a garment intended for an outdoor summer application. By way of still another example, the temperature transition threshold may be about 49 degrees Celsius (e.g., between 45 and 50 degrees Celsius, etc.) for a garment intended for a desert environment application (e.g., military use, etc.). In some embodiments, the transition from the first color to the second color includes a spectrum of colors between the first color and the second color. By way of example, the first color may be purple, the second color may be white, and an intermediate color or colors may be blue and/or red. In some embodiments, the second color is colorless or transparent such that the color of the core 12 is exposed and visible.

Figure 2:
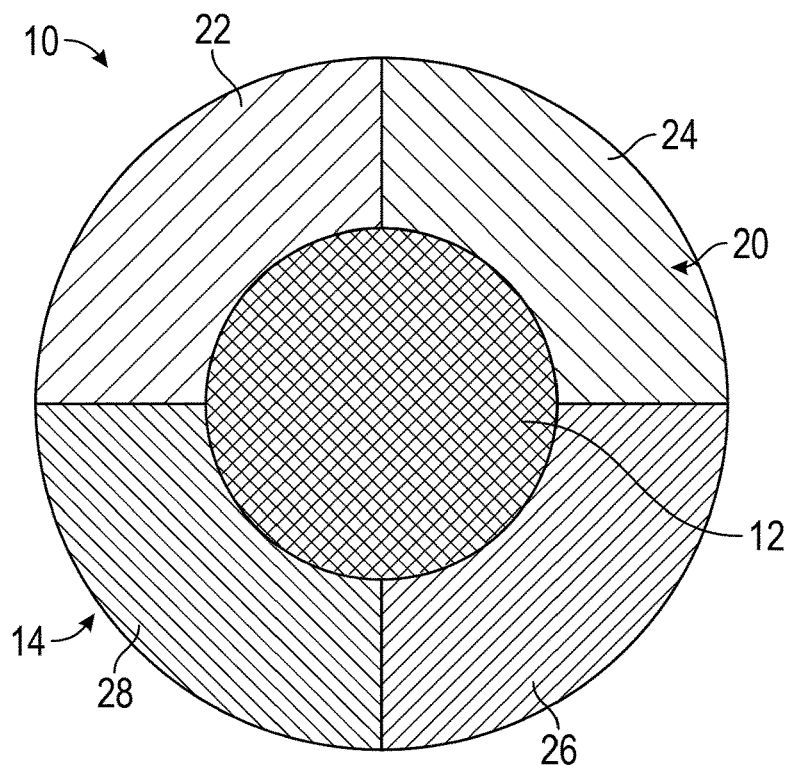
FIG. 2 is a cross-sectional view of a color-changing monofilament, according to another exemplary embodiment.

FIG. 2 illustrates a color-changing fiber according to another exemplary embodiment, in which a coating thereof is divided into different segments (for ease of reference, similar components in the various exemplary embodiments discussed herein bear the same reference numerals). As shown in FIG. 2, the coating 14 of the color-changing fiber 10 includes a layer 20 disposed around and along the core 12 that has four azimuthal segments in which a first segment includes the material 22, a second segment includes a second material (shown as material 24), a third segment includes a third material (shown as material 26), and a fourth segment includes a fourth material (shown as material 28). In other embodiments, the layer 20 includes fewer or greater than four azimuthal segments (e.g., two, three, five, six, etc. segments). In some embodiments, the azimuthal segments are equally sized. In other embodiments, the azimuthal segments may be differently sized. Each of the material 22, the material 24, the material 26, and/or the material 28 may include a polymer or polymer composite that includes a thermochromic pigment. The composition of the various segments may differ depending on the desired effect. In some embodiments, the polymer or polymer composite of the material 22, the material 24, the material 26, and/or the material 28 are the same, and the thermochromic pigments thereof and/or the concentrations of the thermochromic pigments may differ between the different segments (according to other embodiments, the polymer or polymer composite used for one or more of the various segments may also vary). Each of the material 22, the material 24, the material 26, and/or the material 28 may transition from a first color to a second color at a first temperature transition threshold, a second temperature transition threshold, a third temperature transition threshold, and a fourth temperature transition threshold, respectively. The first color of the material 22, the material 24, the material 26, and/or the material 28 may be different or the same. The second color of the material 22, the material 24, the material 26, and the material 28 may be different or the same. The first temperature transition threshold, the second temperature transition threshold, the third temperature transition threshold, and/or the fourth temperature transition threshold may be the same, similar, or different (e.g., dependent on the respective polymer or polymer composite and/or the respective thermochromic pigment and concentration thereof, etc.).

The color of the coating 14 may be seen differently based on the angle at which the azimuthal segments of the coating 14 are being viewed. In some embodiments, the azimuthal segments of the coating 14 facilitate providing the appearance of a shimmering or iridescent material. By way of example, if the coating 14 has multiple azimuthal segments, then the angle at which the color-changing fibers 10 are viewed may change how the colors appear, leading to a shimmering effect. Also, if one or more of the azimuthal segment of the coating 14 include a pigment that transitions to a transparent state, then the core 12 may show through, leading to a shimmering or iridescent effect depending on the angle at which the color-changing fibers 10 are viewed.

Figure 3:
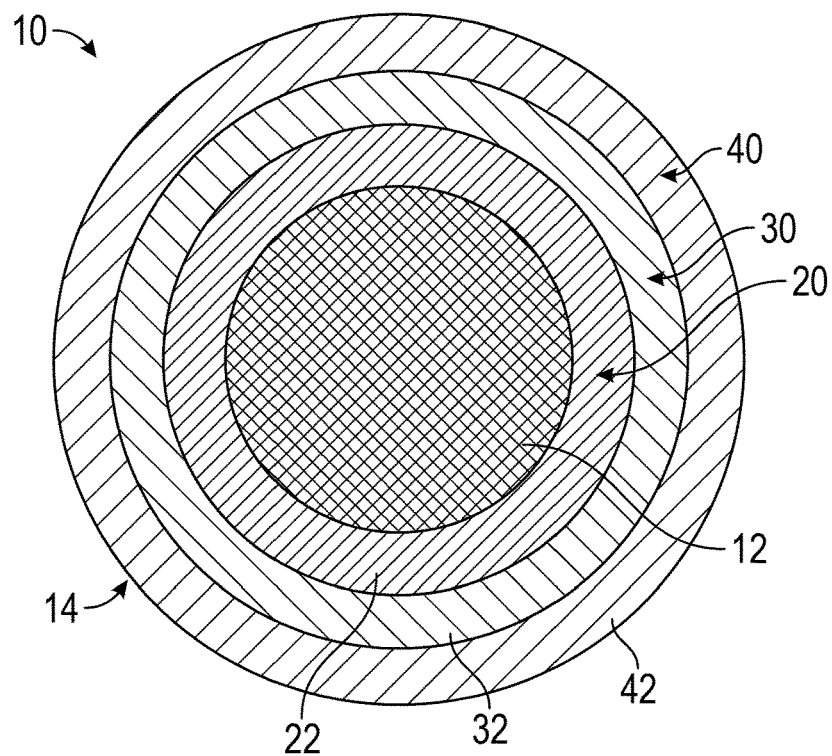
FIG. 3 is a cross-sectional view of a color-changing monofilament, according to another exemplary embodiment.

FIG. 3 illustrates another embodiment of a color-changing fiber. As shown in FIG. 3, the coating 14 of the color-changing fiber 10 has a plurality of concentric layers including the layer 20 disposed around and along the core 12, a second layer, shown as layer 30, disposed around and along the layer 20, and a third layer, shows as layer 40, disposed around and along the layer 30. In other embodiments, the coating 14 includes fewer or greater than three layers (e.g., two, four, etc. layers). The thickness of the layer 20, the layer 30, and/or the layer 40 may be the same or different.

As shown in FIG. 3, the layer 20 includes the material 22, the layer 30 includes a second material, shown as material 32, and the layer 40 includes a third material, shown as material 42. Each of the material 22, the material 32, and/or the material 42 may include a respective polymer or polymer composite that includes a respective thermochromic pigment. In some embodiments, the polymer or polymer composite of the material 22, the material 32, and/or the material 42 are the same, but the thermochromic pigments thereof and/or the concentrations of the thermochromic pigments differ. Each of the material 22, the material 32, and/or the material 42 may transition from a first color to a second color at a first temperature transition threshold, a second temperature transition threshold, and a third temperature transition threshold, respectively. In some embodiments, the material 22 of the layer 20 does not include a thermochromic pigment such that the color thereof is substantially fixed. In such an embodiment, the material 32 of the layer 30 and the material 42 of the layer 40 may transition from an opaque color to transparent to expose the fixed color of the layer 20. According to an exemplary embodiment, the first temperature transition threshold is greater than the second temperature transition threshold and/or the second temperature transition threshold is greater than the third temperature transition threshold. Accordingly, (i) the material 42 of the layer 40 may transition from a first color to transparent at the third temperature transition threshold to expose a second color of the material 32 of the layer 30 underneath, (ii) the material 32 of the layer 30 may transition from the second color to transparent at the second temperature transition threshold to expose a third color of the material 22 of the layer 20 underneath, and (iii) either (a) the material 22 of the layer 20 may transition from the third color to transparent at the first temperature transition threshold to expose the core 12, (b) the material 22 of the layer 20 may transition from the third color to a fourth color (e.g., a non-transparent color, etc.) at the first temperature transition threshold, or (c) the color of the material 22 is substantially fixed.

Figure 4:
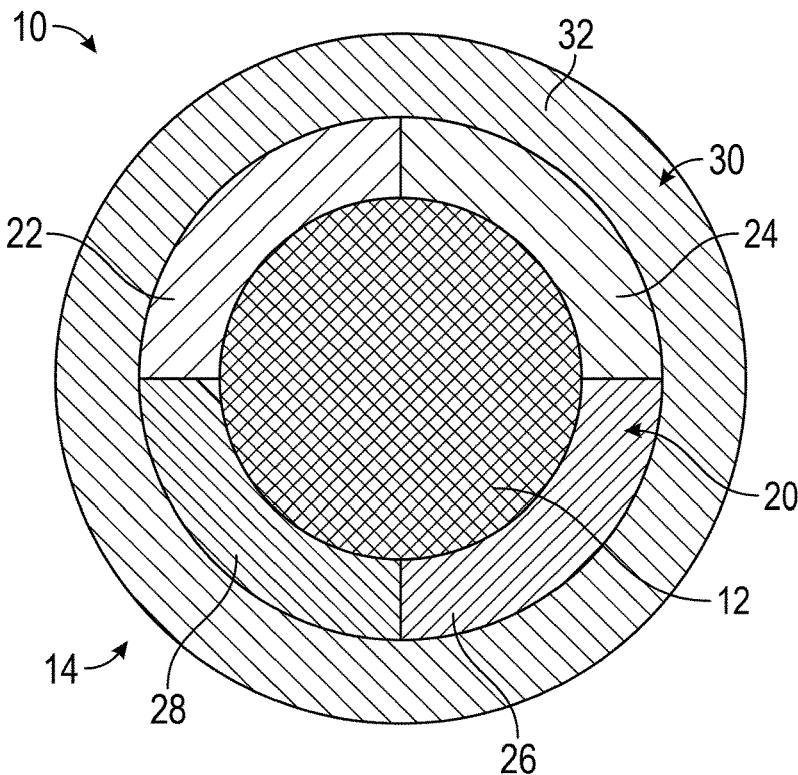
FIG. 4 is a cross-sectional view of a color-changing monofilament, according to another exemplary embodiment.

FIG. 4 illustrates another embodiment of a color-changing fiber. As shown in FIG. 4, the coating 14 of the color-changing fiber 10 is a combination of the embodiments shown in FIGS. 2 and 3. Specifically, the coating 14 includes the layer 20 disposed around and along the core 12 and the layer 30 disposed around and along the layer 20 where the layer 20 has four azimuthal segments that include the material 22, the material 24, the material 26, and the material 28. The layer 20 of FIG. 4 may be similar or function similarly to that of the layer 20 of FIG. 2 and the layer 30 of FIG. 4 may be similar or function similarly to that of the layer 30 of FIG. 3.

Figure 5:
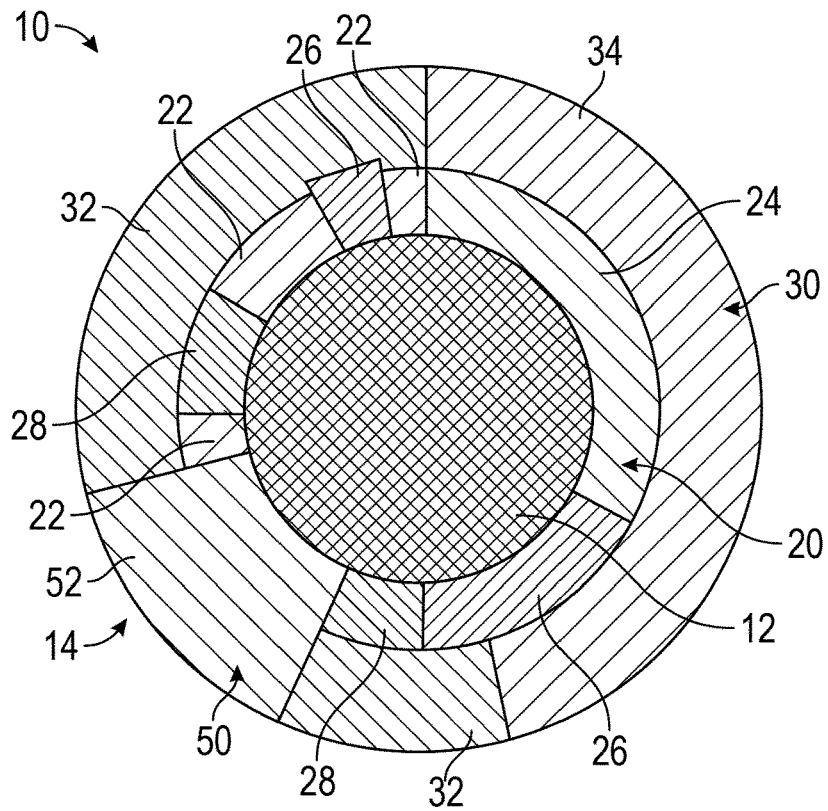
FIG. 5 is a cross-sectional view of a color-changing monofilament, according to another exemplary embodiment.

FIG. 5 illustrates another embodiment of a color-changing fiber. As shown in FIG. 5, the coating 14 of the color-changing fiber 10 includes the layer 20 disposed around and along the core 12 and the layer 30 disposed around and along the layer 20. Both the layer 20 and the layer 30 include a plurality of azimuthal segments of different materials (e.g., a similar polymeric material with different thermochromic pigments, etc.) including (i) the material 22, the material 24, the material 26, and the material 28 variously positioned about the layer 20 and (ii) the material 32 and a material 34 variously positioned about the layer 30. Other combinations of materials or number of azimuthal segments may be used within the layer 20 and/or the layer 30 (e.g., a single material, more materials, fewer azimuthal segments, more azimuthal segments, etc.). As shown in FIG. 5, the layer 20 and the layer 30 only partially extend around the core 12 (e.g., 45, 90, 115, 145, 180, 215, 245, 270, 300, 315, 330, etc. degrees), leaving a gap. The gap is filled with a thicker layer, shown as layer 50, that extends the thickness of the layer 20 and the layer 30. In some embodiments, the color-changing fiber 10 includes three or more concentric layers such that the layer 50 may extend the thickness of the three or more concentric layers.

Figure 6:
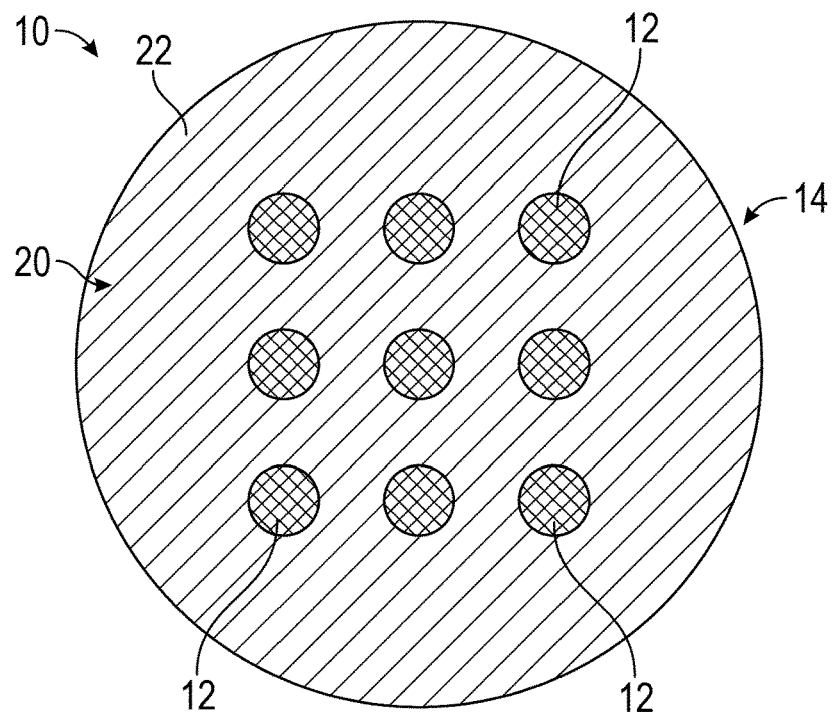
FIG. 6 is a cross-sectional view of a color-changing monofilament, according to another exemplary embodiment.
Figure 7:
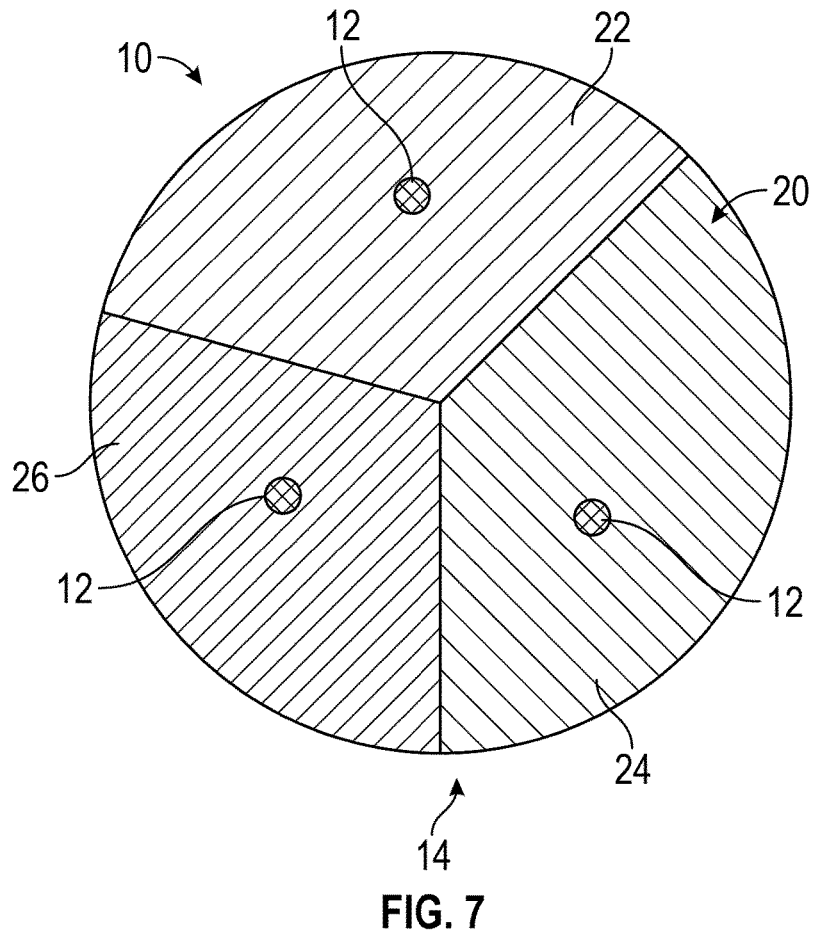
FIG. 7 is a cross-sectional view of a color-changing monofilament, according to another exemplary embodiment.

FIGS. 6 and 7 illustrate additional exemplary embodiments of color-changing fibers. As shown in FIGS. 6 and 7, the color-changing fiber 10 includes a plurality of cores 12 (e.g., a multi-core, etc.). As shown in FIG. 6, the color-changing fiber 10 includes nine separate cores 12 disposed within the material 22 of the layer 20. In other embodiments, the color-changing fiber 10 includes a different number of the cores 12 (e.g., two, three, four, five, six, seven, eight, ten, etc. of the cores 12). As shown in FIG. 7, the color-changing fiber 10 includes three separate cores 12, where each of the cores 12 is disposed within a different material, i.e., the material 22, the material 24, and the material 26, respectively, of the layer 20. The material 22, the material 24, and the material 26 are arranged to form the layer 20 of the color-changing fiber 10 that has a multi-segmented pie structure. In some embodiments, the polymer or polymer composite of the material 22, the material 24, and/or the material 26 are the same, but the thermochromic pigments thereof and/or the concentrations of the thermochromic pigments differ. In other embodiments, the color-changing fiber 10 includes a different number of cores 12 (e.g., two, four, five, etc.) and the layer 20 includes a corresponding number of materials such that each of the cores 12 is embedded within a respective material of the layer 20. Each of the cores 12 may therefore be individually provided an electrical current to affect the visual characteristics of the material associated therewith. In some embodiments, the color-changing fiber 10 of FIGS. 6 and 7 includes additional layers (e.g., the layer 30, the layer 40, etc.) disposed around the layer 20.

Figure 8:
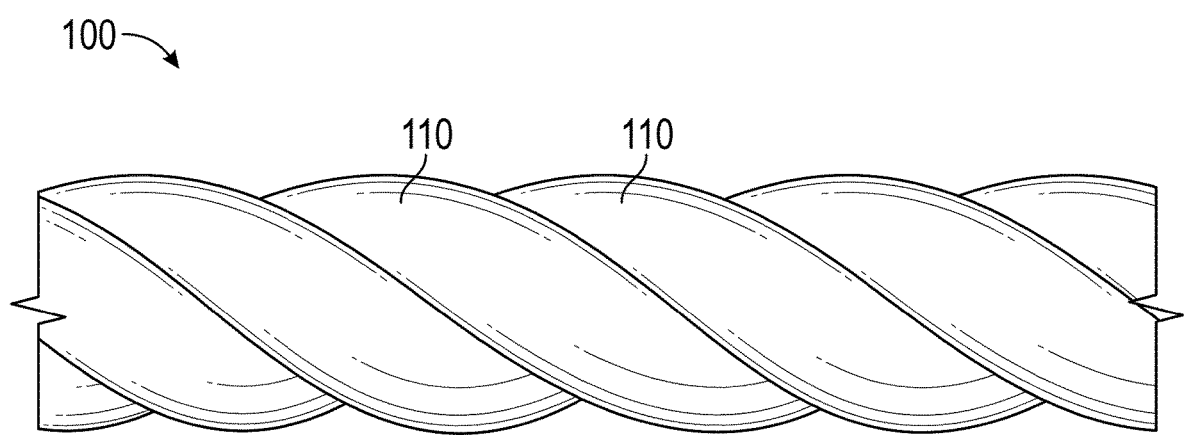
FIG. 8 is a side view of a color-changing multifilament at least partially formed from one or more of the color-changing monofilaments of FIGS. 1-7, according to an exemplary embodiment.

In some embodiments, the color-changing fiber 10 is used to form fabric (e.g., in weaving or knitting processes, etc.) as a monofilament and/or is incorporated into an existing product or fabric (e.g., sewn into an existing fabric, embroidery, etc.) as a monofilament. In some embodiments, as shown in FIG. 8, the color-changing fiber 10 is formed into or incorporated into a multifilament fiber (e.g., yarn, thread, etc.), shown as color-changing yarn 100. The color-changing yarn 100 may be formed by twisting, braiding, or otherwise joining two or more fibers, shown as fibers 110. In some embodiments, the fibers 110 of the color-changing yarn 100 include one type of the color-changing fibers 10 of FIGS. 1-7. In other embodiments, the fibers 110 of the color-changing yarn 100 include a combination of two or more of the types of the color-changing fibers 10 of FIGS. 1-7. In still other embodiments, the fibers 110 of the color-changing yarn 100 include at least one of the color-changing fibers 10 of FIGS. 1-7 and at least one non-color-changing fiber. The non-color-changing fiber may be a (i) natural fiber including plant-based fiber (e.g., cotton, linen, etc.) and/or an animal-based fiber (e.g., wool, silk, etc.) and/or (ii) a synthetic fiber (e.g., rayon, acetate, nylon, acrylic, polyester, etc.).

In some embodiments, the non-color-changing fiber is a photovoltaic fiber. The photovoltaic fibers may be used to generate electrical energy from light energy to (i) charge or power a power source and/or (ii) directly provide an electrical current to the color-changing fibers 10 within the color-changing yarn 100 to facilitate the transition between the possible colors thereof. In some embodiments, the color-changing fiber 10 and/or the color-changing yarn 100 includes a glass core or another type of transparent core. In some embodiments, the color-changing fiber 10 includes sensors, the non-color-changing fiber includes sensors, and/or sensors are otherwise embedded within the color-changing yarn 100 (e.g., sensors to measure temperature, force, pressure, acceleration, moisture, etc.). By way of example, the sensors may be or include piezoelectric sensors that sense a depressive force or pressure (e.g., on the fabric that the color-changing yarn 100 is woven into, etc.). The piezoelectric sensors may send an electrical signal to a controller and the controller may take an appropriate action in response to the depression (e.g., provide electrical current to the color-changing fibers 10 to activate the thermochromic pigment to transition the color, etc.).

Manufacture of the Color-Changing Fiber

Figure 9:
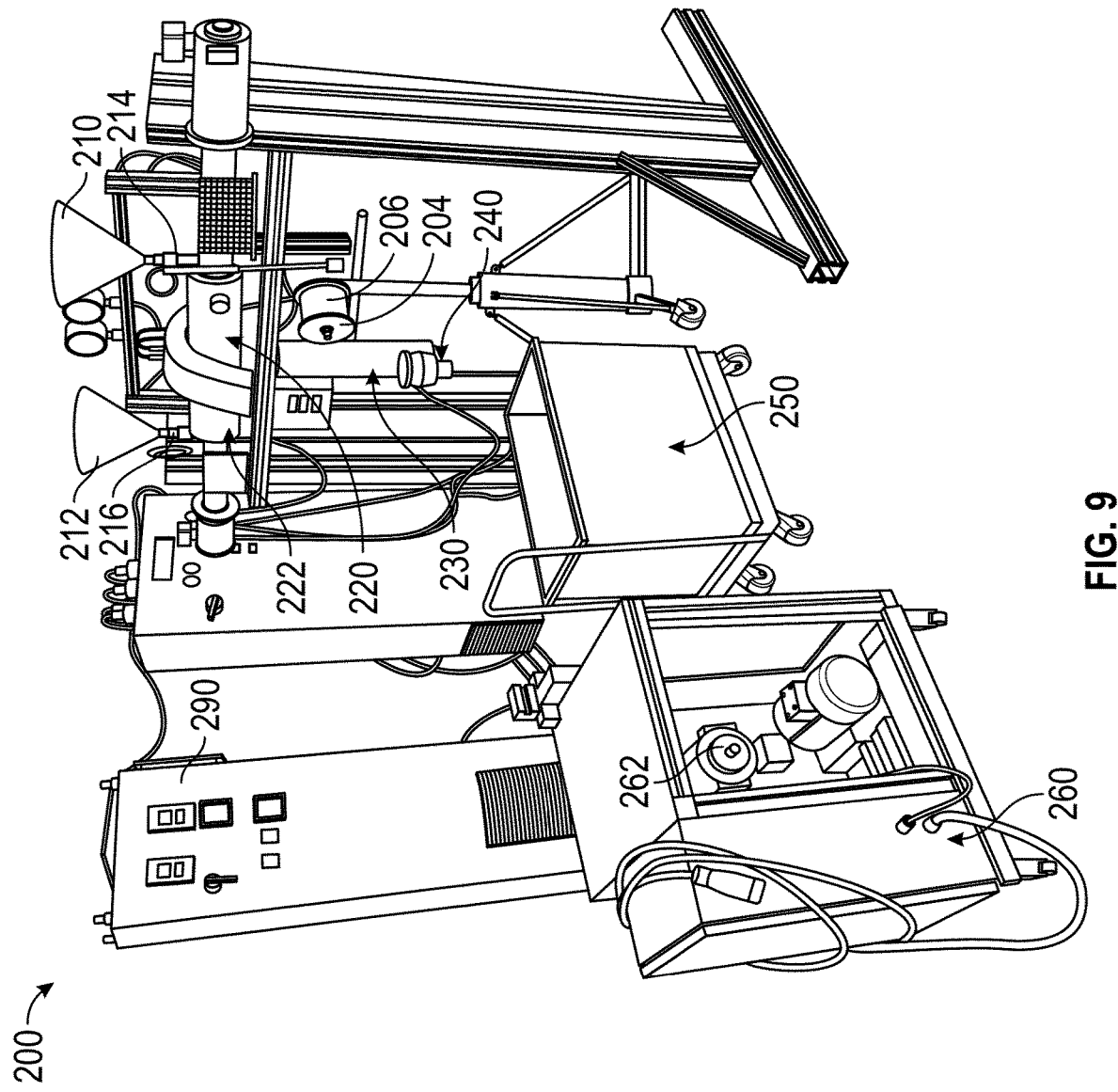
FIG. 9 is a perspective view of a fiber fabrication machine used to produce color-changing monofilaments, according to an exemplary embodiment.
Figure 10A:
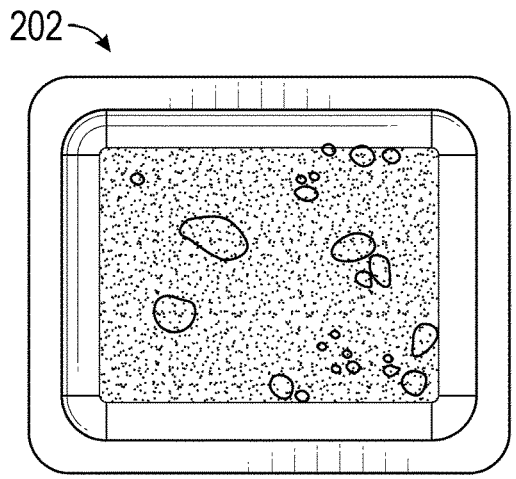
FIGS. 10A-10E are various raw materials that may be used by the fiber fabrication machine of FIG. 9 to form a coating of the color-changing monofilaments, according to an exemplary embodiment.
Figure 10B:
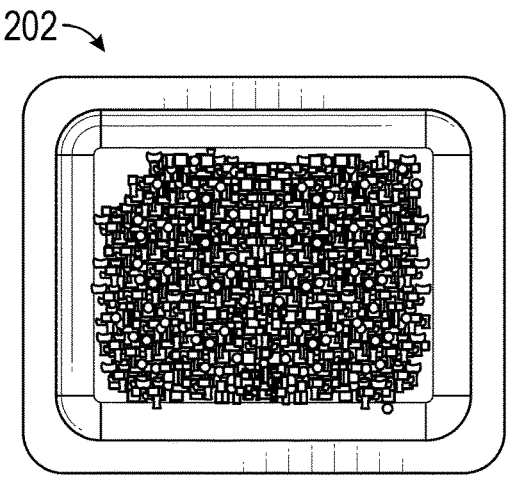
Figure 10C:
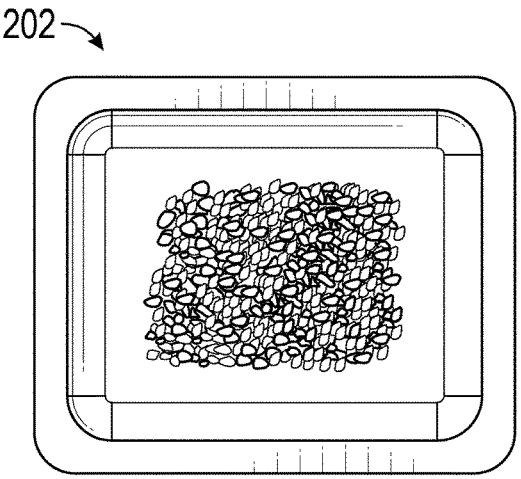
Figure 10D:
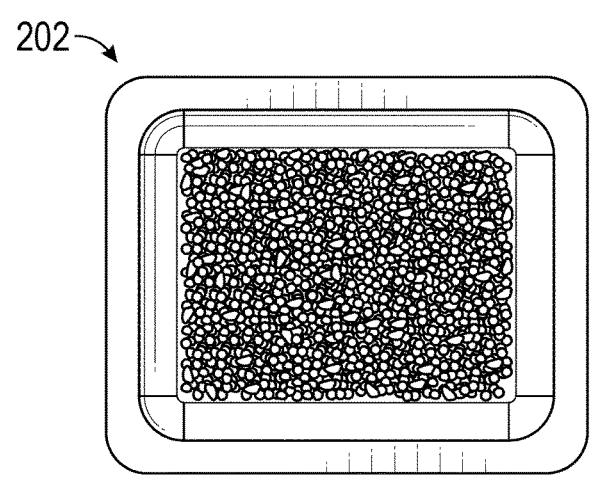
Figure 10E:
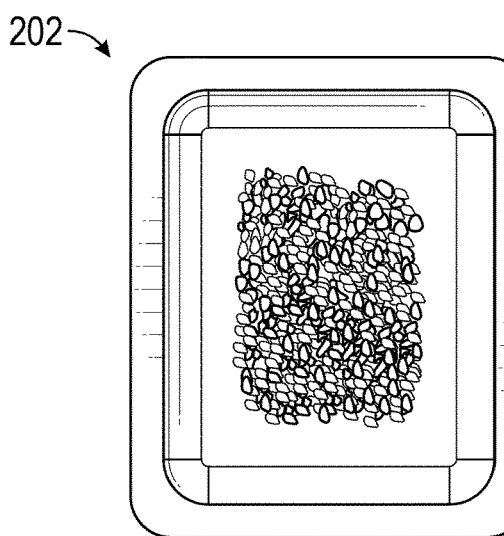

According to the exemplary embodiment shown in FIGS. 9-15, a machine, shown as fiber fabricator 200, is configured to manufacture the color-changing fiber 10. As shown in FIG. 9, the fiber fabricator 200 includes a pair of hoppers, shown as first hopper 210 and second hopper 212, coupled to a pair of drivers, shown as first screw extruder 220 and second screw extruder 222, via conduits, shown as first feed tube 214 and second feed tube 216, respectively.

According to an exemplary embodiment, the first hopper 210 is configured to receive a first raw material of the coating 14 and the second hopper 212 is configured to receive a second raw material of the coating 14. By way of example, the first raw material may be a polymeric material such as thermoplastics, thermoplastic elastomers, polycrystalline polymers, and/or any other suitable material that softens sufficiently to traverse a fiber spinning system and then solidify upon cooling. The second raw material may be (i) a concentrate of the thermochromic pigment, (ii) a concentrate of the thermochromic pigment with added fillers or additives, and/or (iii) a concentrate of the thermochromic pigment and/or additives in a polymer host. The concentrate of the thermochromic pigment may come in the form of powder, pellets of any shape, slurry, ink, and/or another liquid. In other embodiments, the first hopper 210 and the second hopper 220 receive the same material (e.g., a thermochromic pigment and polymer mixture; see, e.g., FIGS. 10A-10E; etc.). In still other embodiments, the fiber fabricator 200 includes a different number of hoppers (e.g., three, four, eight, etc.) that each receive different material and/or facilitate increasing the capacity of material able to be loaded into the fiber fabricator 200.

According to the exemplary embodiment shown in FIG. 9, the first screw extruder 220 is configured to receive the first raw material through the first feed tube 214 and the second screw extruder 222 is configured to receive the second raw material from the second hopper 212 through the second feed tube 216. In other embodiments, the fiber fabricator 200 does not include the second hopper 212, the second feed tube 216, or the second screw extruder 222, but rather the fiber fabricator 200 is configured to receive a premixed mixture or compound of the first raw material and the second raw material. Therefore, (i) the concentrate of the pigment may be pre-mixed uniformly with virgin polymer pellets (e.g., of thermoplastics, thermoplastic elastomers, polycrystalline polymers, etc.) and fed into the first screw extruder 220, (ii) the concentrate of the pigment may be pre-compounded with the virgin polymer pellets and fed into the first screw extruder 220, and/or (iii) the virgin polymer and the concentrate of the pigment may be kept separate and fed into the first screw extruder 220 and the second screw extruder 222 separately to be combined by a spinneret in a prescribed ratio to produce the desired color change for the color-changing fiber 10.

As shown in FIGS. 10A-10E, example raw materials 202 include (a) a concentrate of the thermochromic pigment in the form of a powder, (b) a concentrate of the thermochromic pigment in the form of a powder compounded with a host virgin polymer, (c) a concentrate of the thermochromic pigment in the form of pellets dispersed in a host resin with additives and fillers, (d) the pellets from (c) mixed with virgin polymer pellets, and (e) the pellets from (c) alongside virgin polymer pellets that may be separately introduced into the fiber fabricator 200.

Figure 11:
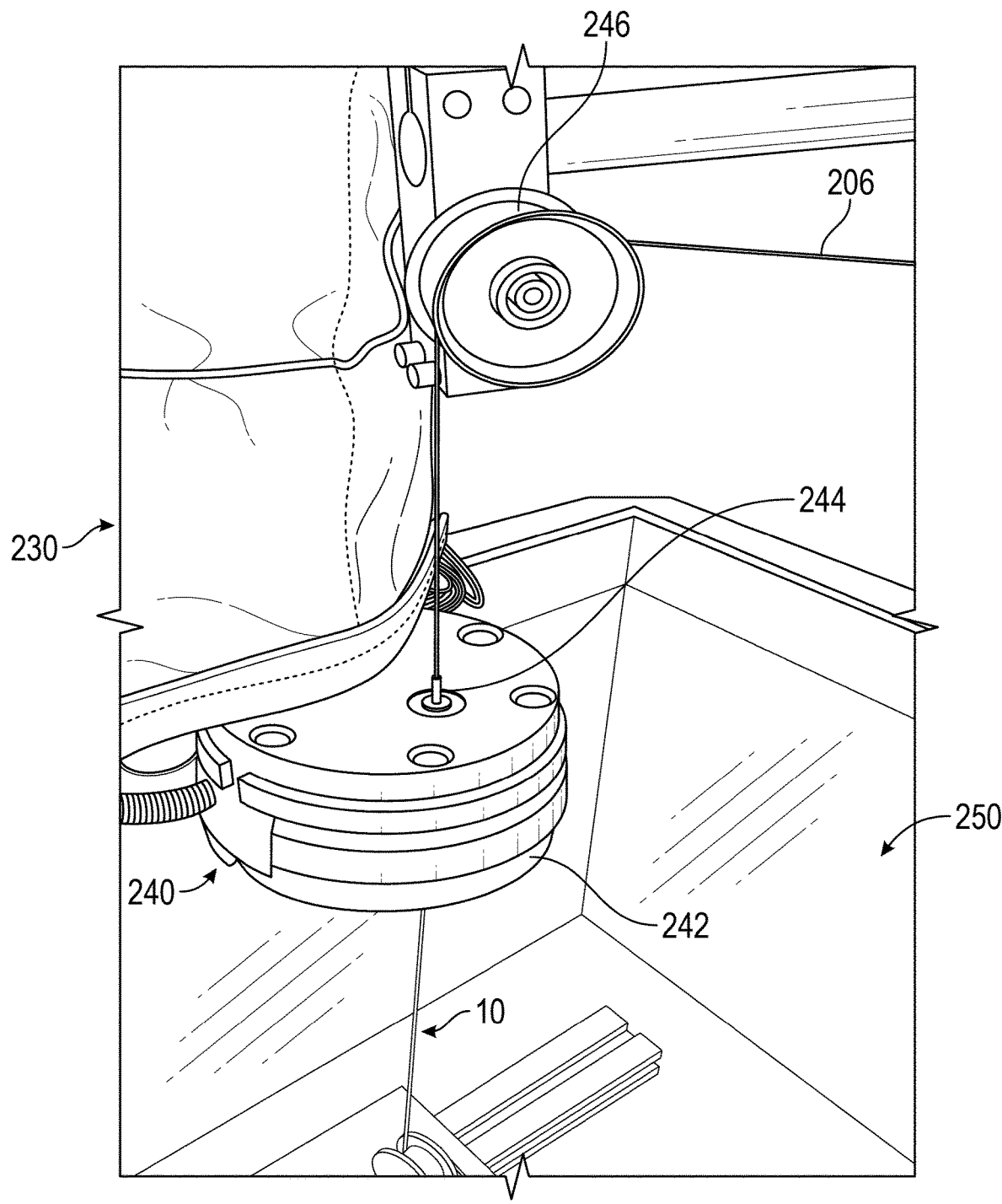
FIG. 11 is a detailed view of a melt pump and a spinneret of the fiber fabrication machine of FIG. 9, according to an exemplary embodiment.

As shown in FIGS. 9-11, the fiber fabricator 200 includes a pump, shown as melt pump 230, coupled to the first screw extruder 220 and the second screw extruder 222. According to an exemplary embodiment, the first screw extruder 220 and the second screw extruder 222 include heating elements that soften or melt the first raw material and/or the second raw material, respectively, which the first screw extruder 220 and the second screw extruder 222 drive into the melt pump 230. According to an exemplary embodiment, the processing temperature of the first raw material and the second raw material (e.g., the raw materials 202, etc.) within the first screw extruder 220 and the second screw extruder 222 is below a degradation temperature of the thermochromic pigment to avoid the destruction of the thermochromic pigment.

As shown in FIGS. 9-11, the fiber fabricator 200 includes a fiber coater, shown as spinneret 240, coupled to the melt pump 230. According to an exemplary embodiment, the melt pump 230 is configured to regulate the volume of the softened and/or melted material that is metered into the spinneret 240. As shown in FIG. 11, the spinneret includes a body, shown as housing 242, and a nozzle, shown as hollow needle 244, extending from the housing 242. As shown in FIG. 9, the fiber fabricator 200 includes a wire payoff attachment, shown as wire spool 204, having a length of prefabricated wire, shown as wire 206, wound therearound.

As shown in FIG. 11, the fiber fabricator 200 includes a first pulley, shown as pulley 246, positioned to receive the wire 206 from the wire spool 204 and guide the wire 206 to the hollow needle 244 and into the housing 242 of the spinneret 240. The spinneret 240 is configured to coat the wire 206 with the material provided by the melt pump 230, which collapses onto the wire 206 to form the color-changing fiber 10 where the wire 206 functions as the core 12 and the material functions as the coating 14. The color-changing fiber 10 is drawn out of or extruded from the housing 242 at a desired diameter by manipulating the amount of material provided by the melt pump 230 to the spinneret 240 and/or the speed of the wire 206 passing through the spinneret 240.

Figure 12:
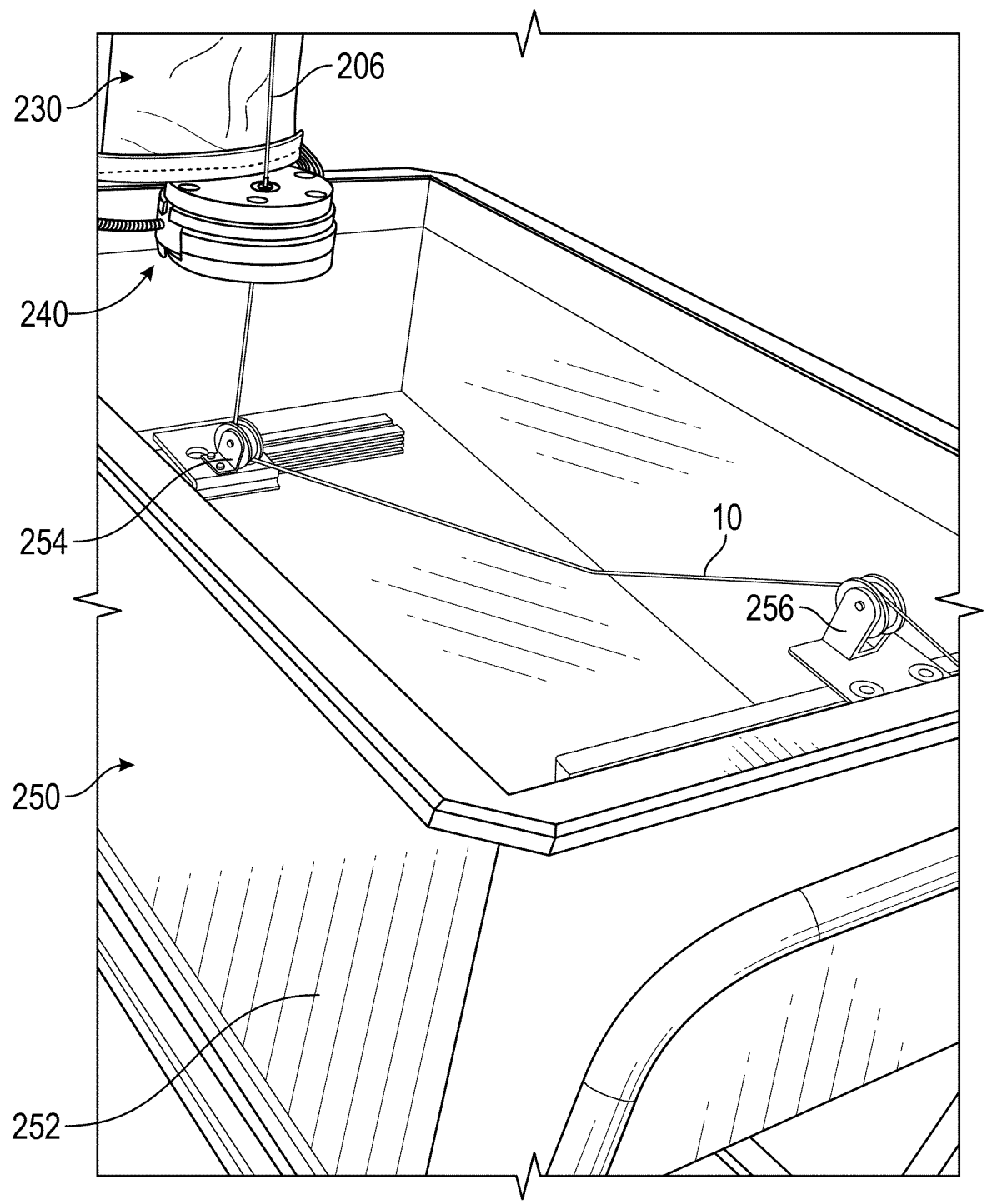
FIG. 12 is a detailed view of a quench assembly of the fiber fabrication machine of FIG. 9, according to an exemplary embodiment.

The newly formed color-changing fiber 10 may then be quenched to solidify and prevent deformation of the coating 14 around the wire 206. As shown in FIGS. 9, 11, and 12, the fiber fabricator 200 includes a quenching assembly, shown as water quench 250. As shown in FIG. 12, the water quench includes a fluid container, shown as tub 252, that holds a volume of fluid such as water (or other suitable fluid). The water quench 250 further includes a second pulley, shown as pulley 254, positioned at the bottom of the tub 252, submerged in the fluid, and proximate a first end of the tub 252, and a third pulley, shown as pulley 256, positioned along a top edge of the tub 252 at an opposing, second end of the tub 252. The pulley 254 is positioned to receive the color-changing fiber 10 from the spinneret 240 and guide the color-changing fiber 10 through the fluid in the tub 252 to the pulley 256. In other embodiments, the coating 14 of the color-changing fiber 10 is quenched via air blade quenching or quenching in the ambient air environment.

Figure 13:
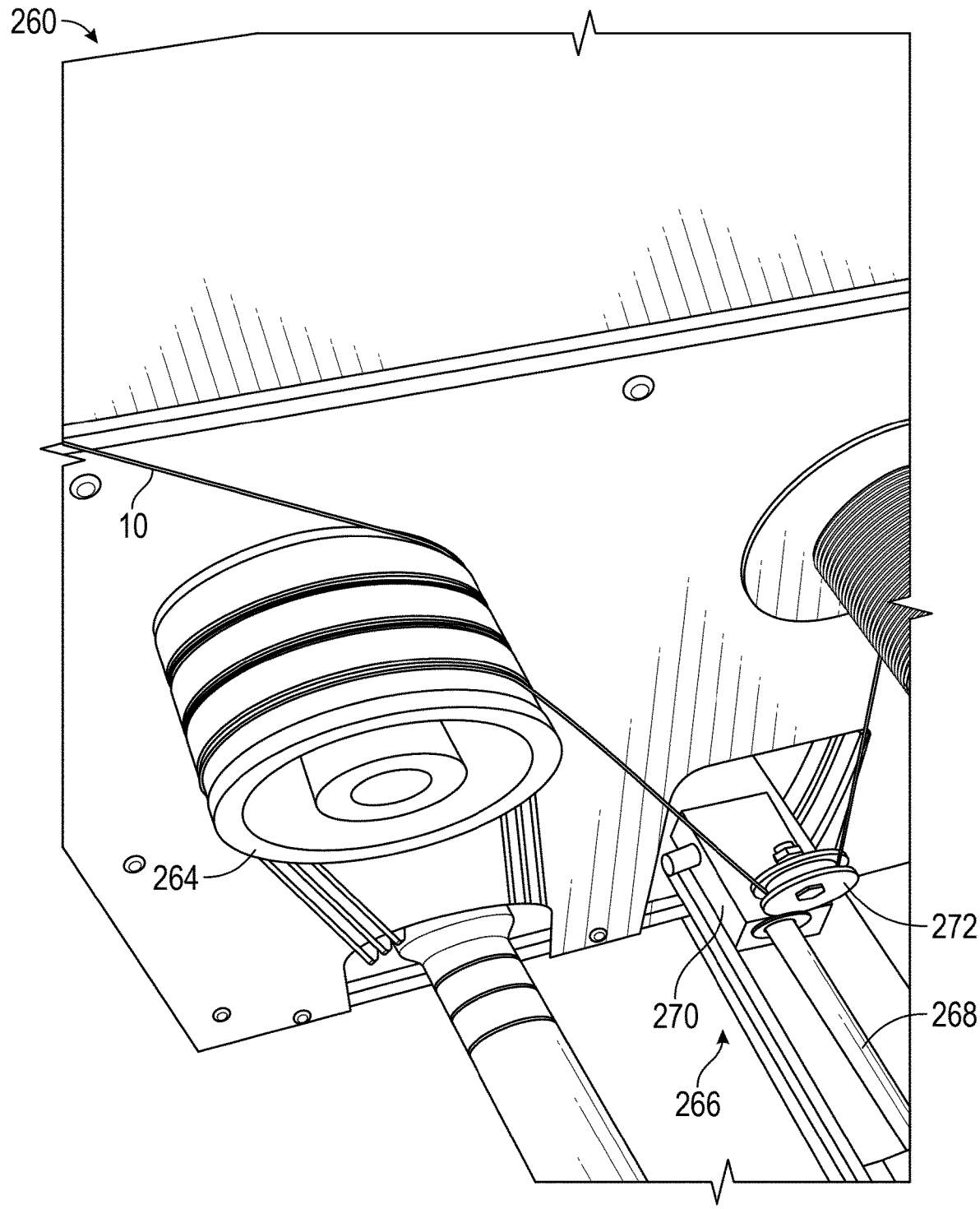
FIGS. 13 and 14 are detailed views of a winder assembly of the fiber fabrication machine of FIG. 9, according to an exemplary embodiment.
Figure 14:
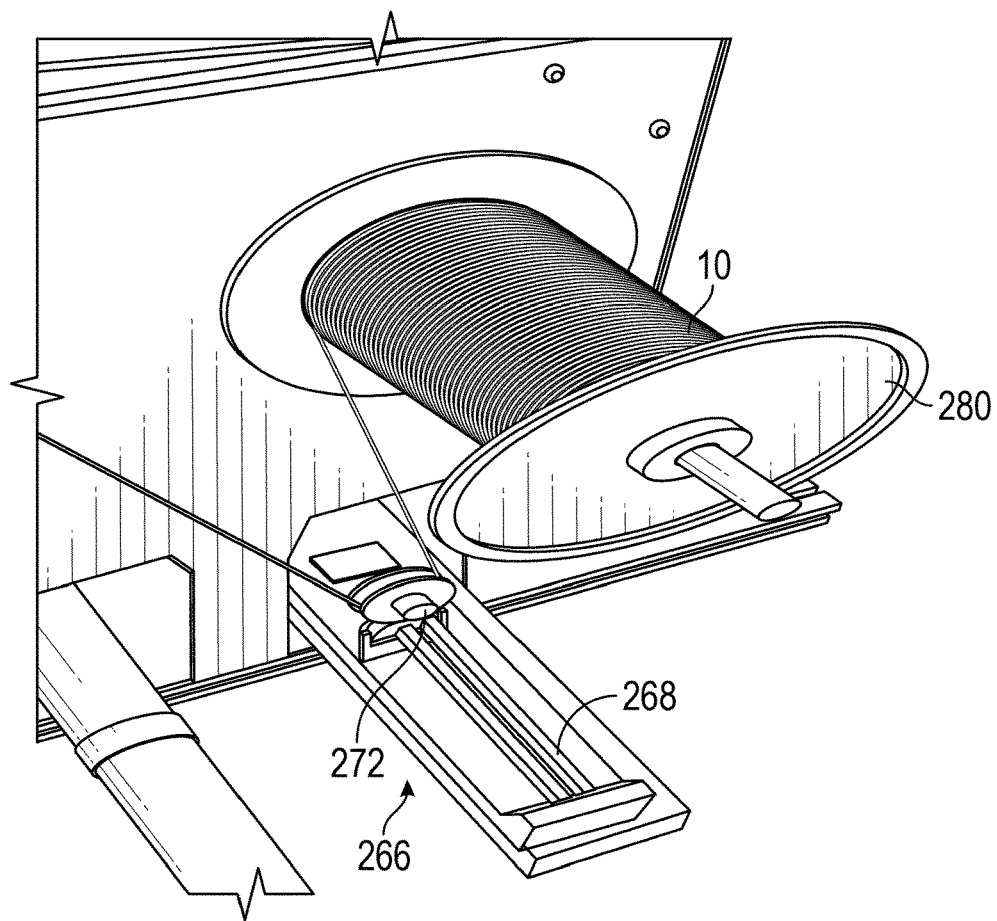

As shown in FIGS. 9 and 13, the fiber fabricator 200 includes a winding assembly, shown as winder 260. The winder 260 includes a motor, shown as drive motor 262, a fourth pulley, shown as godet roll 264, coupled to and driven by the drive motor 262, a traverse assembly, shown as traverse 266, and a take-up roll, shown as fiber spool 280. The traverse 266 includes a guide, shown as track 268, a slide, shown as slide 270, slidably coupled to the track 268, and a fifth pulley, shown as pulley 272, coupled to the slide 270. The godet roll 264 receives the color-changing fiber 10 from the pulley 256 of the water quench 250 and provides the color-changing fiber 10 to the pulley 272 of the traverse 266. The pulley 272 then guides the color-changing fiber 10 to the fiber spool 280. According to an exemplary embodiment, the slide 270 is configured to translate back and forth along the track 268 as the color-changing fiber 10 accumulates on the fiber spool 280 to evenly distribute the color-changing fiber 10 onto the fiber spool 280. The fiber spool 280 may be driven by a corresponding motor (e.g., at a speed based on the speed of the godet roll 264, etc.).

As shown in FIG. 9, the fiber fabricator 200 includes a control system, shown as controller 290. The controller 290 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to an exemplary embodiment, the controller 290 includes a processing circuit having a processor and a memory. The processing circuit may include an ASIC, one or more FPGAs, a DSP, circuits containing one or more processing components, circuitry for supporting a microprocessor, a group of processing components, or other suitable electronic processing components. In some embodiments, the processor is configured to execute computer code stored in the memory to facilitate the activities described herein. The memory may be any volatile or non-volatile computer-readable storage medium capable of storing data or computer code relating to the activities described herein. According to an exemplary embodiment, the memory includes computer code modules (e.g., executable code, object code, source code, script code, machine code, etc.) configured for execution by the processor.

According to an exemplary embodiment, the controller 290 is configured to control operation of the first screw extruder 220, the second screw extruder 222, the melt pump 230, the spinneret 240, the drive motor 262, and/or the traverse 266. By way of example, the controller 290 may control the speed of the wire 206 through the fiber fabricator 200 (e.g., by controlling the speed of the drive motor 262, etc.), the thickness of the coating 14 disposed onto the wire 206 (e.g., by controlling the flow of the melted coating provided by the melt pump 230, the speed of the drive motor 262, etc.), the temperature of the heating elements in the first screw extruder 220 and the second screw extruder 222, and/or the speed at which the first screw extruder 220 and the second screw extruder 222 are driven.

It should be understood that the description of the fiber fabricator 200 in relation to FIGS. 9-15 is just one possible implementation of a machine that may be used to manufacture the color-changing fibers 10 and should not be considered as limiting. In other implementations, the fiber fabricator 200 may include different or variations of components, additional components, fewer components, etc. By way of example, the fiber fabricator 200 may include more hoppers (e.g., three, four, five, etc. hoppers). By way of another example, the fiber coater, the quench assembly, and/or the winder may be different than or a variation of the spinneret 240, the water quench 250, and/or the winder 260 disclosed herein.

Increased production is possible by adjusting the fiber fabricator 200 to include multiple spinnerets 240 with an equal number of winders 260. More complex monofilament structures (e.g., the structures described in FIGS. 2, 4, and 5, etc.) may be produced through the use of distribution plates. The distribution plates may be placed directly below and/or within the spinneret 240, and through carefully designed internal channels, combine raw materials from different screw extruders to produce the desired structure. By way of example, the distribution plates may guide softened polymer in such a way as to create a desired cross-sectional pattern onto the core 12. These structures may enable the production of the color-changing fiber 10 having multiple different thermochromic pigments segregated into each a plurality of segments within the cross-sectional structure. Color-changing fibers 10 with multi-layer coatings (e.g., the coating 14 of FIGS. 3-5, etc.) may be produced by passing the color-changing fiber 10 through the fiber fabricator 200 or a different fiber fabricator 200 one or more additional times to add additional layers to the coating 14. The melt-spinning process may be employed to produce fibers with highly complex, multi-component cross sections, such as a multi-segmented pie that alternates between two or more colors as shown in FIG. 7, which can enable optical effects that cannot be achieved by simply mixing the thermochromic pigments in polymer or braiding different threads into a yarn.

In some embodiments, a cross-section pattern of the coating 14 is generated using a process similar to a pixel-generating printer. In such embodiments, cross-sections that are an image may be generated. Such a process may be suitable for military and/or other applications.

According to another example embodiment, a second fabrication procedure involves the continuous injection of a conductive core material, rather than using a prefabricated wire such as the wire 206. The second fabrication procedure includes the use of raw materials. The raw materials for the coating 14 include those described above, in addition to a raw material or raw materials to form the core 12 (i.e., no pre-existing wire is used). The raw materials to form the core 12 may include (i) low-melting-temperature metals such as tin, indium, etc., (ii) low-melting-temperature metal alloys, (iii) a semiconductor material, (iv) a conductive polymer, or (v) combinations thereof. In some embodiments, the melt temperature of the raw materials for the core 12 is less than the melt temperature of the raw materials for the coating 14.

The second fabrication procedure may be performed as follows: (i) the raw materials for the coating 14 are fed into a hopper (e.g., the first hopper 210, etc.), (ii) the raw materials for the core 12 are loaded into a delivery system (e.g., similar to the second hopper 212 and the second screw extruder 222, etc.), (iii) the raw materials for the core 12 and the coating 14 are melted and delivered to a specialized spinneret (e.g., a bicomponent melt extrusion pack, etc.) where the core 12 and the coating 14 are co-extruded into a core/cladding monofilament architecture, and (iv) the color-changing fiber 10 is quenched and spooled.

According to an exemplary embodiment, the fiber fabrication processes disclosed herein provide flexibility with respect to the materials selection, structure, size, and even shape of each individual fiber. Exercising control over these degrees of freedom facilitates optimizing the heat transfer and thermal distribution over a fabric formed from the individual fibers. For example, materials with different thermal conductivities may heat up and cool down at different rates. The freedom to choose materials that either hold heat (i.e., allowing for less electrical energy to maintain the color change) or dissipate heat (i.e., allowing for quicker color change/return) facilitates tailoring the material to the application. Further, control over the size of the color-changing fiber 10 and the ratio of the diameter of the core 12 to the diameter of the coating 14 facilitates optimizing the largest material volume change per unit electrical energy. Furthermore, control over the diameter of the core 12 (which is the typically a heavier metal component) facilitates controlling the weight (i.e., how "heavy") of the resultant fabric. Such control therefore facilitates tailoring the fibers based on different application needs.

Figure 15:
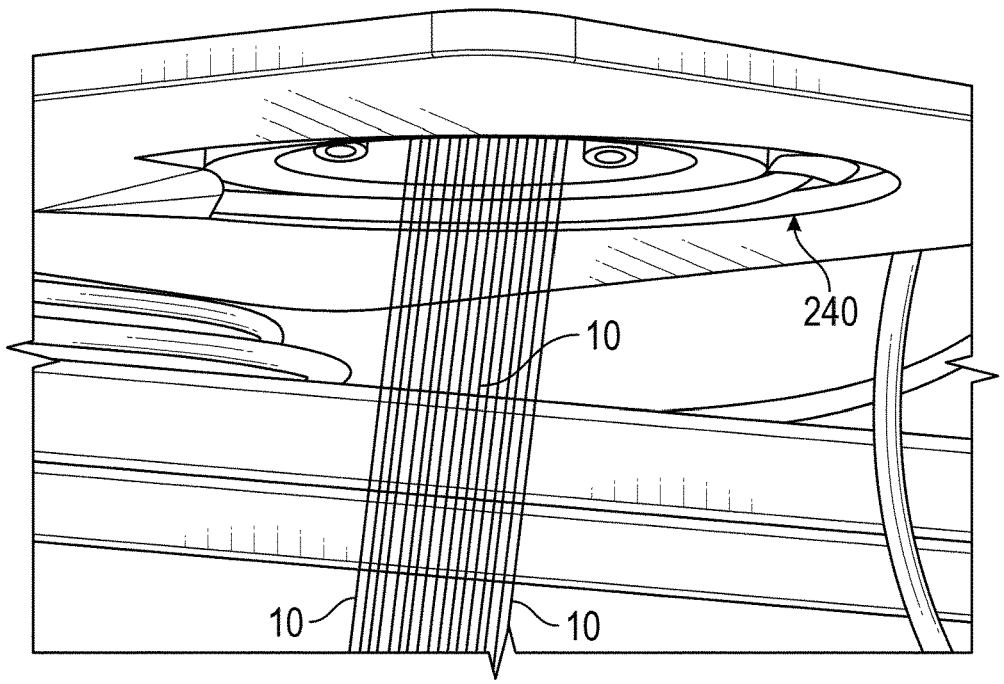
FIG. 15 is a detailed view of a multi-filament spinneret of the fiber fabrication machine of FIG. 9, according to an exemplary embodiment.

The fabrication of the color-changing yarn 100 may be performed in many ways. In one embodiments, the color-changing fiber 10 on the fiber spool 280 is combined (e.g., twisted, braided, etc.) with (i) one or more other color-changing fibers 10 from other fiber spools 280 and/or (ii) one or more non-color-changing fibers from other spools. In another embodiment, multiple fiber fabricators 200 are set up in parallel (e.g., each including the hoppers, the screw extruders, the melt pumps, the spinnerets, etc.). The resultant color-changing fiber 10 from each fiber fabricator 200 may be fed into a combining machine (e.g., a braiding machine, etc.) that forms the color-changing yarn 100 from the plurality of color-changing fibers 10. The color-changing yarn 100 may then be spooled. In still another embodiment, as shown in FIG. 15, the spinneret 240 (e.g., a multi-filament spinneret, etc.) is configured to receive a plurality of the wires 206 and facilitate coating each of the plurality of wires 206 with the coating 14 such that a plurality of color-changing fibers 10 exit the spinneret 240 simultaneously. The plurality of color-changing fibers 10 may be individually spooled using respective winders 260 or the plurality of color-changing fibers 10 may be fed into a combining machine (e.g., a braiding machine, etc.) that forms the color-changing yarn 100 from the plurality of color-changing fibers 10.

Color-Changing Fabric
Prototype Fabrics and Testing

Applicant has produced various color-changing fabric prototypes through its research and development. The first generation fabric prototype included fibers from cyclic olefin copolymer that cold-drew under tension during weaving, which resulted in buckling of the fabric.

Figure 16:
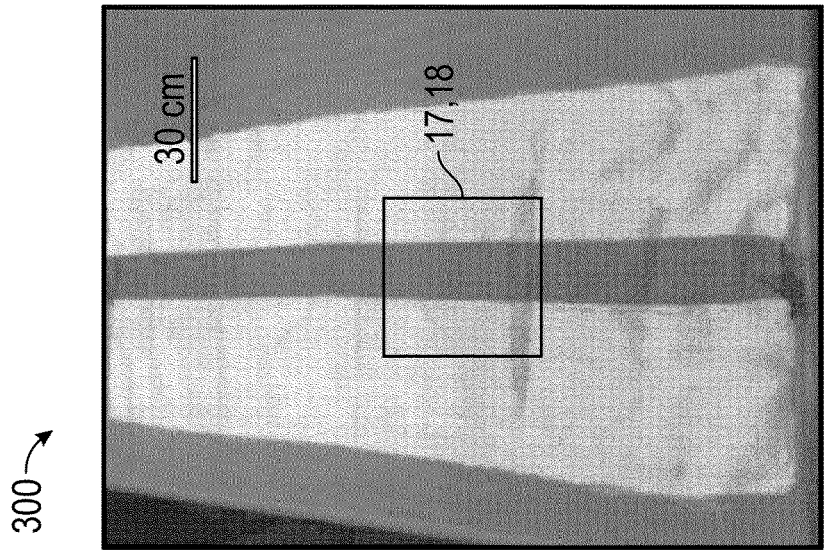

A second generation fabric prototype included fibers with a thermoplastic elastomer coating comprising a species of Hytrel, which did not undergo cold-drawing under tension during the weaving process. The fibers were fabricated using a melt-spinning machine (e.g., the fiber fabricator 200, etc.) to extrude the polymer infused with the thermochromic pigment around a 37 AWG copper wire. The resultant monofilament (e.g., the color-changing fiber 10, etc.) had an outer diameter of approximately 450 micrometers. As shown in FIGS. 16-19, a fabric, shown as color-changing fabric 300, was woven from the monofilament with a cotton-nylon blend in the warp direction. As shown in FIG. 16, an active area of the color-changing fabric 300 had a dark color (e.g., a blue color, etc.), which comprised the color-changing fibers. The color-changing fabric 300 had dimensions of 53 inches by 22 inches, and the dark strip containing the color-changing fibers was approximately 4 inches wide. To electrically connect the cores of the fibers, Applicant selectively dissolved approximately one inch of the coating from the end of the fibers, leaving the ends of the cores exposed. The end of the cores were then grouped into clusters or separate segments and soldered together (e.g., groups of 12-13 cores, etc.).

Figure 18:
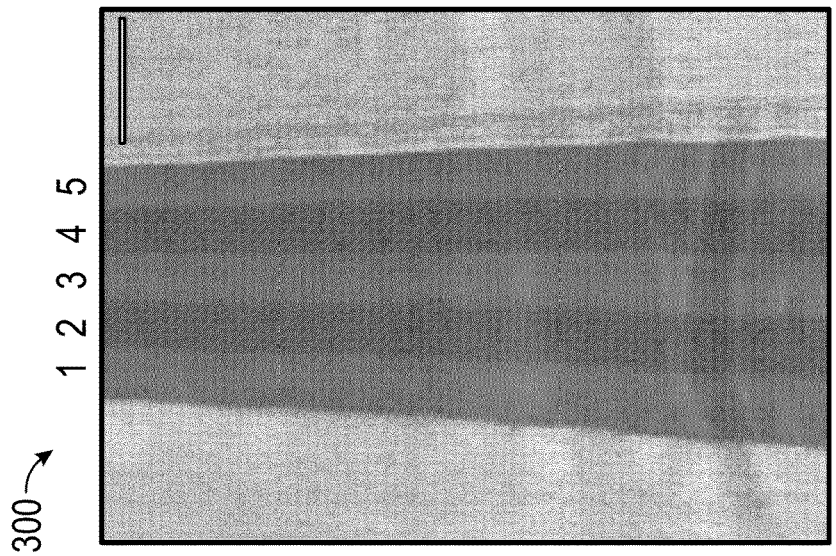
FIGS. 16-18 are various images of a fabric prototype, according to an exemplary embodiment.
Figure 17:
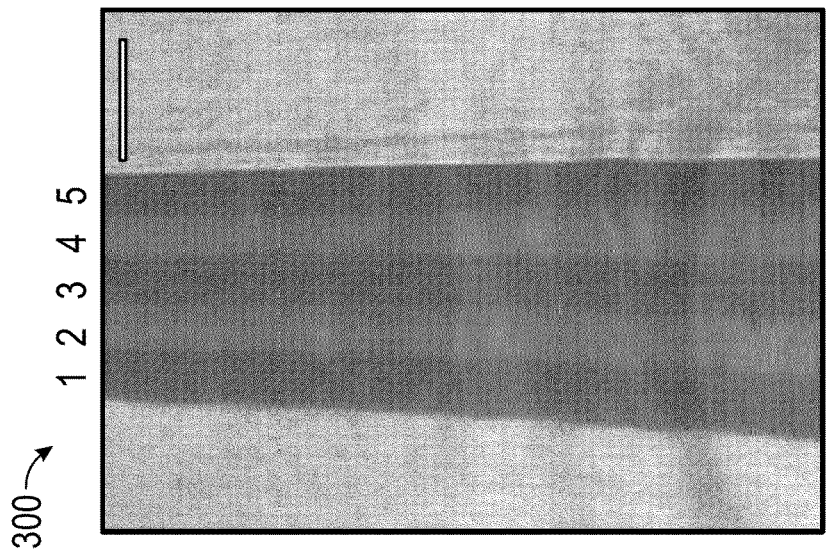
Figure 19:
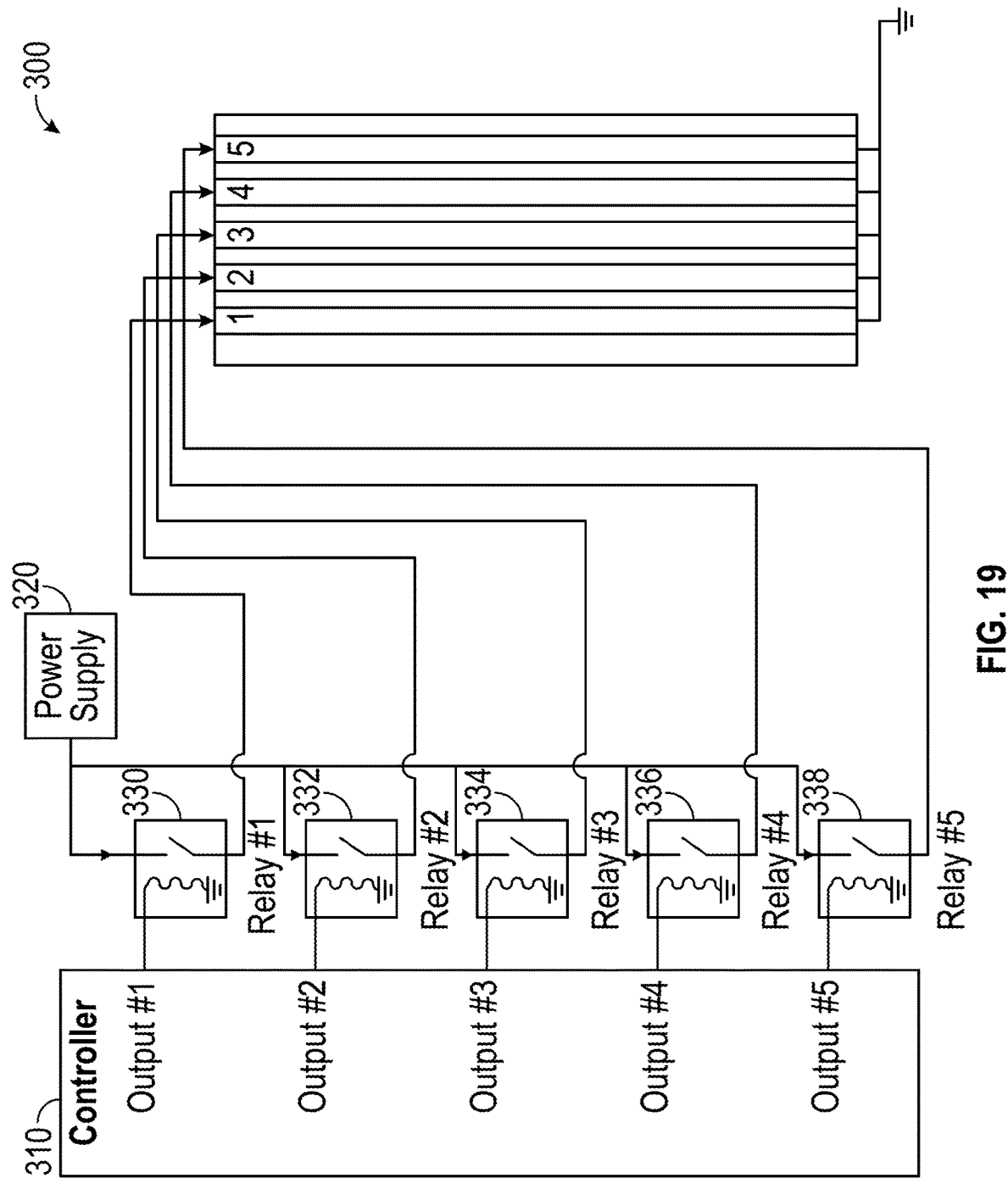
FIG. 19 is a schematic of the fabric prototype of FIGS. 16-18, according to an exemplary embodiment.

As shown in FIGS. 17-19, the 4 inch wide portion of the color-changing fabric 300 comprising the color-changing fibers was electrically separated into five segments, shown as first segment, second segment, third segment, fourth segment, and fifth segment. As shown in FIG. 19, each of the five segments was electrically coupled to a respective switch device, shown as first relay 330, second relay 332, third relay 334, fourth relay 336, and fifth relay 338. The first relay 330, the second relay 332, the third relay 334, the fourth relay 336, and the fifth relay 338 were configured to facilitate selectively electrically coupling the first segment, the second segment, the third segment, the fourth segment, and the fifth segment, respectively, to a control system (in this prototype an Arduino controller), shown as controller 310, and a power source, shown as power supply 320. The controller 310 was configured to selectively engage and disengage the first relay 330, the second relay 332, the third relay 334, the fourth relay 336, and the fifth relay 338 to selectively provide electrical current from the power supply 320 to the first segment, the second segment, the third segment, the fourth segment, and the fifth segment, respectively.

As shown in FIG. 17, the controller 310 selectively engaged the second relay 332 and the fourth relay 336 such that the second segment and the fourth segment transitioned from a darker color (blue) to a lighter color (white/colorless), while the first relay 330, the third relay 334, and the fifth relay 338 were left disengaged such that the first segment, the third segment, and the fifth segment remained the darker color. As shown in FIG. 18, the controller 310 then (i) selectively engaged the first relay 330, the third relay 334, and the fifth relay 338 such that the first segment, the third segment, and the fifth segment transitioned from the darker color to the lighter color and (ii) selectively disengaged the second relay 332 and the fourth relay 336 such that the second segment and the fourth segment transitioned back to the darker color from the lighter color.

A third generation fabric prototype was fabricated from a new spool of color-changing fiber with an even larger active area. The concentration of the thermochromic pigment was increased approximately 50% relative to the second prototype from 4% by mass thermochromic pigment (96% by mass virgin Hytrel) to 6% by mass thermochromic pigment (94% by mass virgin Hytrel) and the polymeric material was switched to a different species of Hytrel (from Hytrel 3038 to Hytrel 5526). The fibers of the second prototype had a tacky surface, likely due to the softness of the species of Hytrel chosen. The tackiness made the weaving process difficult and slow. The new species of Hytrel did not result in a tacky surface after coating the wire core, and the weaving speed was able to be performed at up to 150 picks per minute. In addition, a different thermochromic pigment concentrate was blended with the Hytrel polymer, which caused the color-changing fibers to transition from green to yellow, rather than from blue to colorless.

A red hue could be seen in the second prototype when the segments were activated due to the copper wire in the core of the fibers. The enamel coating on the copper had a red tint, and when the blue pigment transitioned to colorless, the fibers became semi-transparent, revealing the wire inside. With the third prototype, the green-to-yellow pigment never transitioned colorless such that the copper wire core was not visible. The width of the active area in the third fabric prototype was 16 inches and the length of the active area was 66 inches. In the third prototype, the active color-changing area was increased by a factor of approximately 6.7 relative to the second prototype. In the third prototype, Applicant grouped the cores into sixteen independently controllable segments along the width of the fabric. With the various prototypes and testing, Applicant has identified various ways to manufacture the color-changing fibers 10 and the color-changing yarns 100, and then arrange (e.g., weave, knit, etc.) or incorporate (e.g., embroider, stitch, etc.) the color-changing fibers 10 and the color-changing yarns 100 into a fabric and/or end product that has visual characteristics that may be selectively, adaptively, and/or dynamically controlled (e.g., colors, patterns, etc.).

Fabric Manufacturing Process

Figure 20:
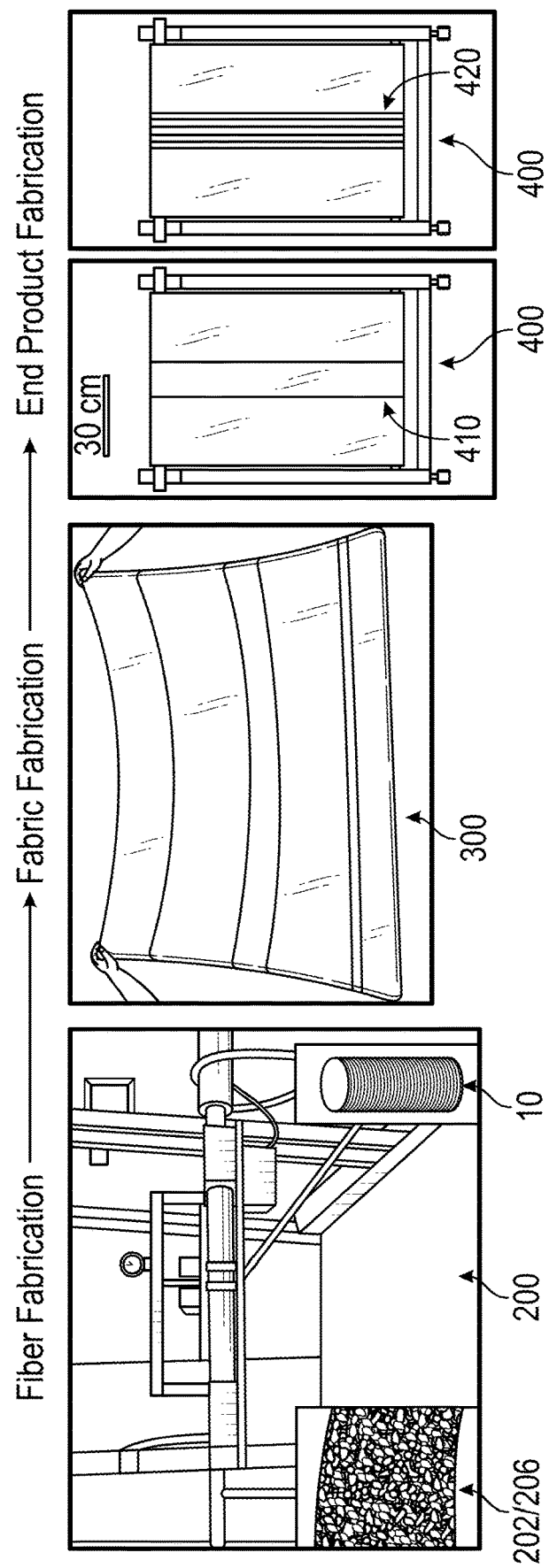
FIG. 20 visually depicts a process of manufacturing an electrically controllable, color-changing end product, according to an exemplary embodiment.

Referring to FIG. 20, a process of manufacturing an electrically controllable, color-changing end product is visually depicted, according to an exemplary embodiment. As shown in FIG. 20, the fiber fabricator 200 receives raw materials (e.g., the raw materials 202 for the coating 14, the wire 206 for the core 12, the raw materials for the core 12, etc.) and produces the color-changing fiber 10 therefrom. The color-changing fiber 10 may then be: (i) combined with other fibers (e.g., the same color-changing fiber 10, a different color-changing fiber 10, a non-color-changing fiber, etc.) to make the color-changing yarn 100, which may then be woven with non-color-changing fibers or yarns (e.g., a cotton-nylon blend, etc.) to form the color-changing fabric 300 (e.g., the non-color-changing fibers or yarns are woven in a first direction of the fabric and the color-changing yarns 100 are woven in a second direction, etc.), (ii) woven directly with non-color-changing fibers or yarns to form the color-changing fabric 300 (e.g., the non-color-changing fibers or yarns are woven in a first direction of the fabric and the color-changing fiber 10 are woven in a second direction, etc.), (iii) combined with other fibers to make the color-changing yarn 100, which may then be knitted to form the color-changing fabric 300 (or the color-changing product 400 directly), or (iv) kitted to form the color-changing fabric 300 (or the color-changing product 400 directly). The color-changing fibers 10 of the color-changing fabric 300 may be electrically connected in a desired manner and then the color-changing fabric 300 may be manipulated (e.g., cut, shaped, joined to other fabrics, etc.) to form an end product, shown as color-changing product 400 (e.g., shown here as a window-blind, etc.), that is capable of transitioning a visual characteristic thereof from a first state, shown as state 410, to a second state, shown as state 420.

Various weaving and/or knitting techniques may be used to arrange the color-changing fibers 10 and/or the color-changing yarns 100 into the color-changing fabric 300 and/or the color-changing product 400. By way of example, the weaving and/or knitting techniques may include a twill/herringbone weave, a satin weave, a loom weave, a basket weave, a plain weave, a Jacquard weave, an Oxford weave, a rib weave, courses and wales knitting, weft and warp knitting, and/or other suitable weaving and/or knitting techniques.

Electrical Connections

Connecting each of the color-changing fibers 10 of a respective color-changing fabric 300 or a respective color-changing product 400 to a power source (e.g., the power supply 320, the power supply 520, etc.) and/or control circuitry (e.g., the controller 310, the controller 510, etc.) can range from being a relatively simple process to a relatively complicated process depending on the desired performance or color-changing capabilities of the respective color-changing fabric 300 and/or the respective color-changing product 400.

By way of example, if a uniform color change for the entire area of the color-changing fabric 300 or the color-changing product 400 that comprises the color-changing fiber 10 is desired, the electrical connections to the color-changing fibers 10 and/or the color-changing yarns 100 may be simplified to a two position connector. More specifically, for a single, uniform color changing application, Applicant has devised a procedure in which: (i) the coating 14 is stripped from the cores 12 on each end of the color-changing fabric 300 (e.g., by selective dissolution, etc.), (ii) the exposed cores 12 along each side of the color-changing fabric 300 are coupled together (e.g., by soldering, by ultrasonic welding, etc.) en masse, and (iii) each of the connected ends of the color-changing fabric 300 is electrically connected to a respective electrical node, which is then coupled to the power source, forming a closed loop.

Figure 21A:
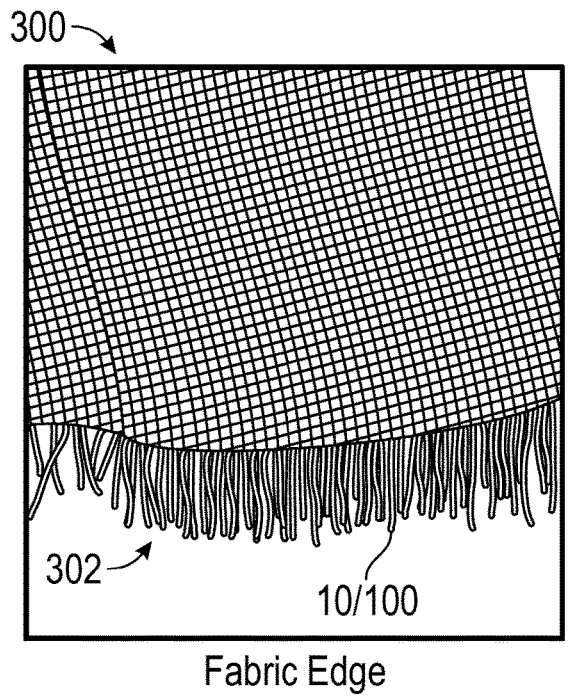
FIG. 21A-21D visually depict a process of electrically connecting color-changing fibers to a power source, according to an exemplary embodiment.
Figure 21B:
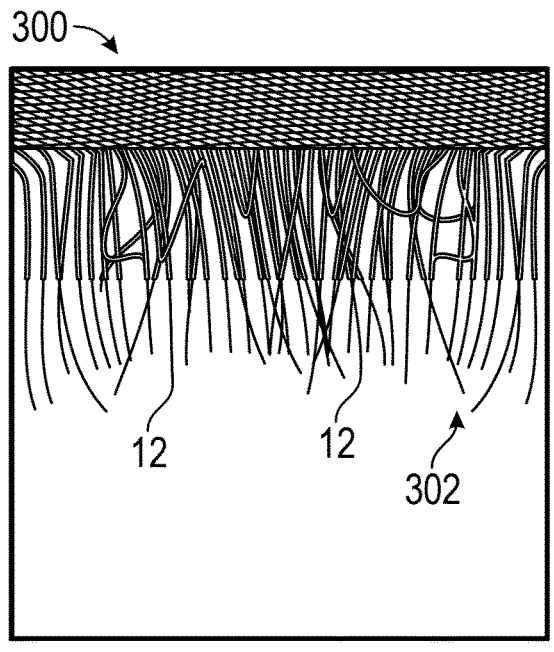
Figure 21C:
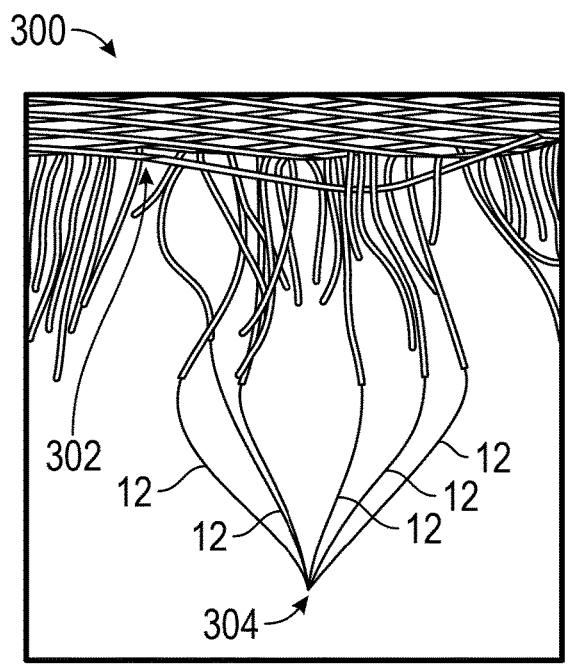
Figure 21D:
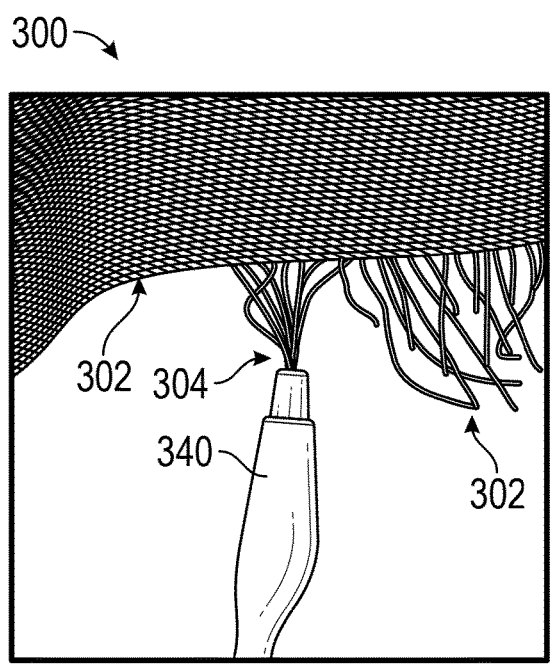

Whereas a more complex pattern or control scheme for color changing may necessitate connecting and addressing the color-changing fibers 10 and/or the color-changing yarns 100 individually or grouping them together. As shown in FIG. 21A, edges 302 of the color-changing fabric 300 may have loose ends of color-changing fibers 10 and/or color-changing yarns 100 extending therefrom. As shown in FIG. 21B, the coating 14 may be selectively removed from the ends of the color-changing fibers 10 and/or the color-changing yarns 100 to expose the cores 12 thereof. The removal of the coating 14 from the loose ends of the color-changing fibers 10 and/or the color-changing yarns 100 may be performed using a chemical removal process (e.g., dissolving the coating 14 in a solution, etc.), a mechanical removal process (e.g., mechanically stripping the coating 14 therefrom, etc.), and/or still another suitable removal process. As shown in FIGS. 21C and 21D, ends of selected cores 12 may be grouped and connected together. By way of example, the grouped ends may be soldered together. By way of another example, the ends may be joined using an ultrasonic welding process. For example, an ultrasonic welding system may connect a first plurality of cores 12 along a preselected distance (e.g., 0.1 inches, 0.25 inches, 0.5 inches, 1 inch, 1.5 inches, 2 inches, 4 inches, 6 inches, 1 foot, etc.) of the edge 302, move or index the color-changing fabric 300 the preselected distance (e.g., via a conveyor, etc.), connect a second plurality of cores 12 along the preselected distance of the edge 302, and so on. As shown in FIG. 21D, the grouped ends, shown as groupings 304, may then each be connected to the power source and/or the control system via a connector, shown as electrical connector 340.

Figure 22:
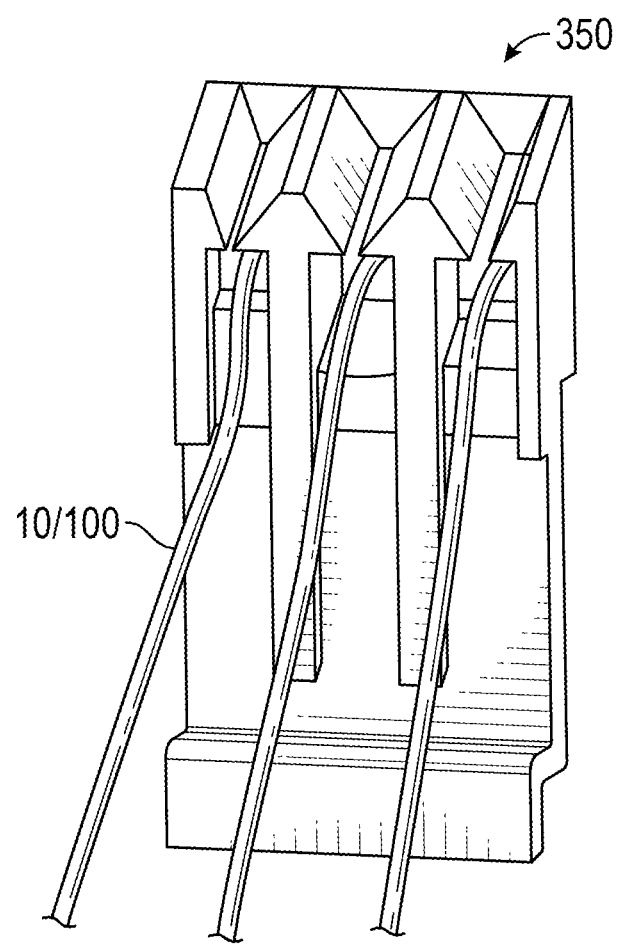
FIG. 22 is a perspective view of a connector, according to an exemplary embodiment.

For larger diameter color-changing fibers 10 and/or color-changing yarns 100 (e.g., which may be used in stationary fixtures, for cores 12 that are between 22 AWG (i.e., 0.644 millimeters) and 36 AWG (i.e., 0.127 millimeters), an insulation displacement connector (IDC) fixture (e.g., a ribbon cable connector, etc.), shown as IDC 350 in FIG. 22, may be used to connect a plurality of the color-changing fibers 10 and/or the color-changing yarns 100 without the need to strip the coating 14 from the ends of the cores 12. According to an exemplary embodiment, the IDC 350 facilitates coupling the color-changing fibers 10 and/or the color-changing yarns 100 to an external circuit (e.g., a power source, a controller, etc.). Care should be taken to connect the individual color-changing fibers 10 and/or color-changing yarns 100 to the IDC 350 in the proper order so that each of the color-changing fibers 10 and/or the color-changing yarns 100 has a known connector position at both the top and bottom of the color-changing fabric 300. If the proper order is maintained, each of the color-changing fibers 10 and/or the color-changing yarns 100 in the color-changing fabric 300 or other application (e.g., the color-changing product 400, etc.) may be individually activated.

Another strategy for connecting fibers to a plug individually is to remove the insulation of the fiber ends simultaneously using a chemical process (e.g., using chloroform, etc.), and then to tin the ends of the wires simultaneously using a solder pot. Next, the individually prepared fiber ends may be soldered to a connector or directly to a printed circuit board. With this method, care must be taken to ensure that the fibers are connected in a sequential order. It may be possible to design a fixture to secure individual fibers in the correct order before soldering them to a connector or a printed circuit board.

Another consideration is the nature of electrical connectivity across the color-changing fabric 300: whether to connect the color-changing fibers 10 and/or the color-changing yarns 100 together in a series pattern, a parallel pattern, or a combination of the two. The availability of metals and wires of varying electrical conductivity can be selected to adjust the resistance of any of these three configurations.

Applications

According to an exemplary embodiment, the color-changing fibers 10, the color-changing yarns 100, and/or the color-changing fabrics 300 are capable of being incorporated into existing products (e.g., using embroidery, as a patch, etc.) and/or arranged to form new products (e.g., using weaving, knitting, etc.) with color-changing capabilities, i.e., the color-changing products 400. Various examples of the color-changing products 400 are shown in FIGS. 23-32. It should be understood that the color-changing products 400 shown in FIGS. 23-32 are examples of possible implementations of the color-changing fibers 10, the color-changing yarns 100, and/or the color-changing fabrics 300 and should not be considered as an exclusive or exhaustive representation of such implementations. Specifically, the uses of the color-changing fibers 10, the color-changing yarns 100, and/or the color-changing fabrics 300 are expansive and may be used in products such as apparel (e.g., headbands, wristbands, ties, bowties, shirts, jerseys, gloves, scarves, jackets, pants, shorts, dresses, skirts, blouses, footwear/shoes, belts, hats, etc.), accessories (e.g., purses, backpacks, luggage, wallets, jewelry, hair accessories, etc.), fixed installations, home goods, and décor (e.g., table cloths, blankets, bed sheets, pillow cases, curtains, window blinds, rugs, wall paper, wall art/paintings, furniture and furniture accessories, automotive interiors, etc.), outdoor applications and equipment (e.g., tents, awnings, umbrellas, canopies, signage, etc.), camouflage, and/or still other suitable applications.

As shown in FIGS. 23 and 24, the color-changing product 400 is configured as a first product, shown as dress 430. As shown in FIG. 23, the dress 430 is in a first state (e.g., a first color, etc.), shown as first color state 432. As shown in FIG. 24, the dress 430 is transitioned into a second state (e.g., a second color, etc.), shown as second color state 434. According to an exemplary embodiment, the dress 430 is arranged entirely from the color-changing fibers 10 and/or the color-changing yarns 100 such that the entire dress 430 is capable of transitioning between the first color state 432 and the second color state 434. In other embodiments, only a portion of the dress 430 is configured to transition between the first color state 432 and the second color state 434 (e.g., at least a portion of the dress 430 includes non-color-changing fibers or yarns, etc.).

As shown in FIGS. 25 and 26, the color-changing product 400 is configured as a second product, shown as shirt 440. As shown in FIG. 25, the shirt 440 is in a first state, shown as first pattern state 442, where the shirt 440 lacks a pattern or is all the same color (e.g., a solid color, etc.). As shown in FIG. 26, the shirt 440 is transitioned into a second state, shown as second pattern state 444, where various portions or segments of the shirt 440 transition to a second color different than the remaining portions of the shirt 440. According to the embodiment shown in FIG. 26, the second pattern state 444 includes a plurality of vertical stripes 446 generated across the shirt 440. According to an exemplary embodiment, the portions of the shirt 440 that transition to selectively generate the vertical stripes 446 include the color-changing fibers 10 and/or the color-changing yarns 100. In other embodiments, the color-changing fibers 10 and/or the color-changing yarns 100 within the shirt 440 are arranged such that the second pattern state 444 additionally or alternatively provides a horizontal stripe pattern, a checkered pattern, a diagonal stripe pattern, a polka dot pattern, and/or another suitable pattern. In some embodiments, the shirt 440 is capable of selectively transitioning between a plurality of different patterns.

As shown in FIGS. 27 and 28, the color-changing product 400 is configured as a third product, shown as jersey 450. The jersey 450 includes a first patch, shown as name patch 452, and a second patch, shown as number patch 454, coupled (e.g., stitched, adhesively coupled, sewn, etc.) thereto. According to an exemplary embodiment, the name patch 452 and the number patch 454 include the color-changing fibers 10 and/or the color-changing yarns 100 integrated therein or embroidered thereto. According to an exemplary embodiment, the name patch 452 and the number patch 454 are couplable to the fabric or other material of a preexisting jersey (or other preexisting product) such that name patch 452 and the number patch 454 may therefore provide a "retrofit" solution to produce the color-changing products 400. In some embodiments, the jersey 450 does not include one of the name patch 452 or the number patch 454. In other embodiments, the name patch 452 and/or the number patch 454 are replaced with another type of patch (e.g., a logo patch, a sponsor patch, a team name patch, etc.). As shown in FIG. 27, the name patch 452 and the number patch 454 of the jersey 450 are in a first state, shown as first player state 456, where the color-changing fibers 10 and/or the color-changing yarns 100 thereof are selectively activated to display a first name and a first number associated with a first player in a different color than the remainder of the name patch 452 and the number patch 454. As shown in FIG. 28, the name patch 452 and the number patch 454 of the jersey 450 are transitioned into a second state, shown as second player state 458, where the color-changing fibers 10 and/or the color-changing yarns 100 thereof are selectively activated to display a second name and a second number associated with a second player in a different color than the remainder of the name patch 452 and the number patch 454. It should be understood that name and number are used as an example and should not be interpreted as being limiting. Patches including the color-changing fibers 10 and/or the color-changing yarns 100 may be configured (e.g., designed, arranged, etc.) to facilitate providing virtually any type of pattern, design, wording, numbers, etc. on the patch. In an alternative embodiment, the functionality of the name patch 452 and/or the number patch 454 is directly integrated into the jersey 450 by embroidering the color-changing fibers 10 and/or the color-changing yarns 100 directly into the jersey 450.

In some embodiments, a patch useable with the color-changing products 400 includes the photovoltaic fibers disclosed herein. The patch may exclusively include photovoltaic fibers, be incorporated into yarns that include the color-changing fibers 10, and/or be weaved or embroidered into a patch that also includes the color-changing fibers 10. Such photovoltaic fibers may be used to generate electrical energy from light energy to be stored in a power source and/or provided to the color-changing fiber 10.

Figure 29:
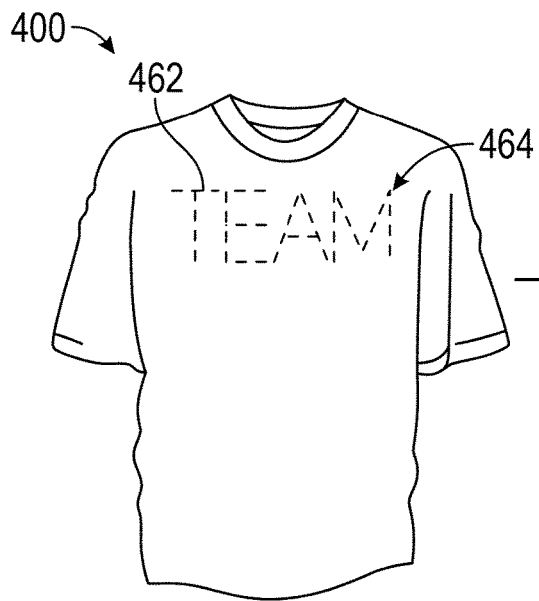
FIGS. 29 and 30 show a fourth color-changing product having an embroidered portion in a first state and a second state, according to an exemplary embodiment.
Figure 30:
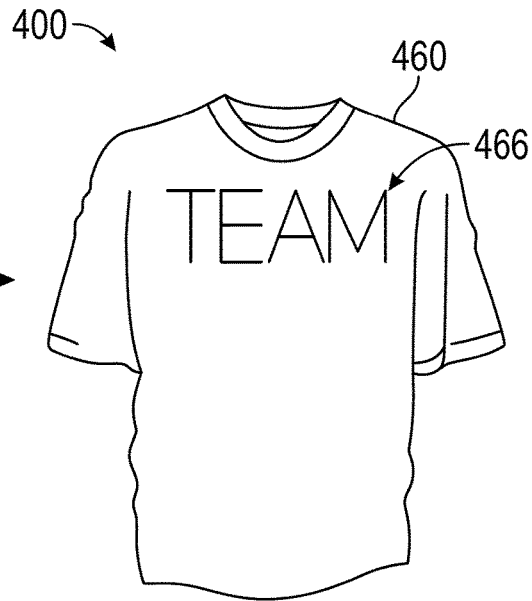

As shown in FIGS. 29 and 30, the color-changing product 400 is configured as a fourth product, shown as shirt 460. The shirt 460 includes an embroidered section, shown as embroidered portion 462. According to an exemplary embodiment, the embroidered portion 462 is formed by directly incorporating the color-changing fibers 10 and/or the color-changing yarns 100 into the fabric or other material of a preexisting shirt (e.g., a newly manufactured shirt, a used shirt, etc.) (or other preexisting product). The color-changing fibers 10 and/or the color-changing yarns 100 may therefore facilitate providing a "retrofit" solution to produce the color-changing products 400. As shown in FIG. 29, the embroidered portion 462 is in a first state, shown as first color state 464, where the color-changing fibers 10 and/or the color-changing yarns 100 thereof are selectively activated or deactivated to be a first color, a first set of colors, or have other first visual characteristics (e.g., a pattern, etc.). As shown in FIG. 30, the embroidered portion 462 is in a second state, shown as second color state 466, where the color-changing fibers 10 and/or the color-changing yarns 100 thereof are selectively activated or deactivated to be a second color, a second set of colors, or have other second visual characteristics different than the first color state 464. The embroidered portion 462 may include patterns, logos, sports team names, sponsor names, player names, player numbers, etc.

Figure 31:
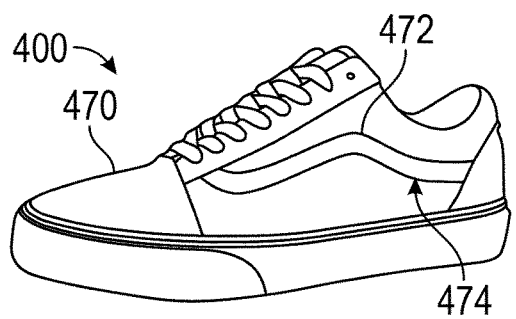
FIGS. 31 and 32 show a fifth color-changing product having an embroidered portion in a first state and a second state, according to an exemplary embodiment.
Figure 32:
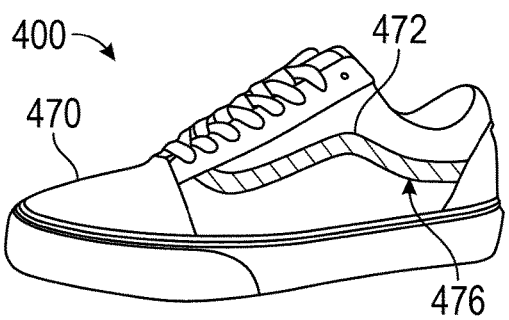

As shown in FIGS. 31 and 32, the color-changing product 400 is configured as a fifth product, shown as shoe 470. The shoe 470 includes an embroidered portion, shown as embroidered portion 472. According to an exemplary embodiment, the embroidered portion 472 is formed by directly incorporating the color-changing fibers 10 and/or the color-changing yarns 100 into the fabric or other material of a preexisting shoe (e.g., a newly manufactured shoe, a used shoe, etc.) (or other preexisting product). As shown in FIG. 31, the embroidered portion 472 is in a first state, shown as first color state 474, where the color-changing fibers 10 and/or the color-changing yarns 100 thereof are selectively activated or deactivated to be a first color, a first set of colors, or have other first visual characteristics. As shown in FIG. 32, the embroidered portion 472 is in a second state, shown as second color state 476, where the color-changing fibers 10 and/or the color-changing yarns 100 thereof are selectively activated or deactivated to be a second color, a second set of colors, or have other second visual characteristics (e.g., a pattern, etc.) different than the first color state 474.

It should be understood that the concepts presented in the first product, the second product, the third product, the fourth product, and the fifth product above are not required to be independent of each other, but rather the concepts may be combined in a single product. By way of example, a single color-changing product 400 may include a combination of (i) being formed (e.g., woven, knit, etc.) from the color-changing fibers 10, the color-changing yarns 100, and/or the color-changing fabrics 300, (ii) include one or more patches, and/or (iii) include one or more embroidered portions, which may all be independently controlled and activated.

Product Control System

Any of a variety of systems and methods may be used to control the color-changing fibers 10, the color-changing yarns 100, the color-changing fabrics 300, and/or the color-changing products 400 disclosed herein. According to the exemplary embodiment shown in FIG. 33, a control system, shown as control system 500, is coupled (e.g., electrically coupled, communicatively coupled, mechanical coupled, etc.) to the color-changing product 400 and includes a control device (e.g., similar to controller 310, etc.), shown as controller 510, a power source (e.g., similar to power supply 320, etc.), shown as power supply 520, and a user input, shown as input device 530. The controller 510 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 33, the controller 510 includes a processing circuit having a processor 512 and a memory 514. The processing circuit may include an ASIC, one or more FPGAs, a DSP, circuits containing one or more processing components, circuitry for supporting a microprocessor, a group of processing components, or other suitable electronic processing components. In some embodiments, the processor 512 is configured to execute computer code stored in the memory 514 to facilitate the activities described herein. The memory 514 may be any volatile or non-volatile computer-readable storage medium capable of storing data or computer code relating to the activities described herein. According to an exemplary embodiment, the memory 514 includes computer code modules (e.g., executable code, object code, source code, script code, machine code, etc.) configured for execution by the processor 512.

Figure 33:
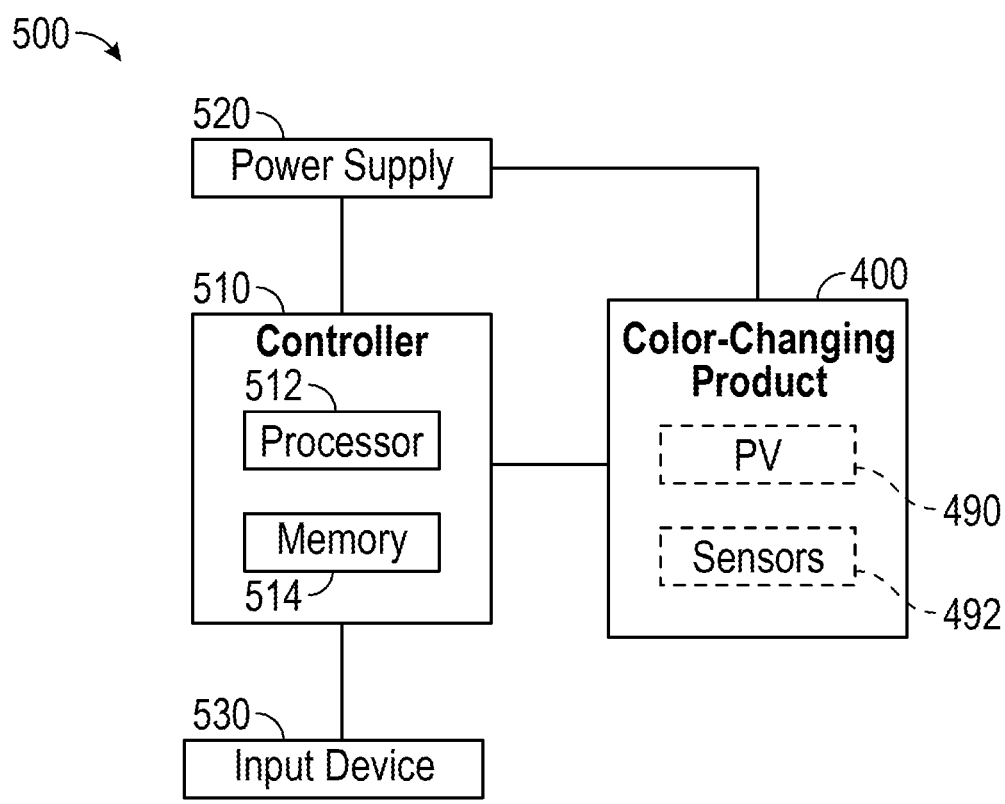
FIG. 33 is a schematic diagram of a control system for the color-changing products of FIGS. 23-32, according to an exemplary embodiment.

According to an exemplary embodiment, the power supply 520 is configured to facilitate selectively providing an electrical current to the color-changing fibers 10 and/or the color-changing yarns 100 of the color-changing product 400 (e.g., based on commands provided by the controller 510, etc.) to activate the thermochromic pigments in the coatings 14. The power supply 520 may be a rechargeable battery pack, a replaceable battery pack, and/or another suitable power supply. The power supply 520 may be chargeable using a direct connection to an external power source (e.g., a mains power line, etc.), wirelessly using wireless charging technology, and/or require that batteries therein be replaced on occasion. In some embodiments, as shown in FIG. 33, the color-changing product 400 includes a photovoltaic source, shown as PV source 490. The PV source 490 may be or include photovoltaic fibers incorporated into the color-changing yarns 100, an independent photovoltaic patch, etc. The PV source 490 may charge the power supply 520, supplement the power supply 520 in providing current to the color-changing fibers 10, and/or, in some embodiments, obviate the need for the power supply 520 altogether.

According to an exemplary embodiment, the input device 530 is configured to facilitate a user or operator of the color-changing product 400 with selectively controlling the visual appearance (e.g., color, pattern, etc.) of the color-changing product 400 (e.g., may be used to remotely control the color and/or pattern of a fabric or of an individual fiber, etc.). The input device 530 may be configured to communicate with the controller 510 via any suitable wireless communication protocol (e.g., Bluetooth, NFC, Zigbee, radio, cellular, Wi-Fi, etc.) and/or wired communication protocol. The input device 530 may be a cellular phone, a "smart" phone, a remote control, a computing device such as a laptop computer, a switch device, a button device, a "smart home" controller device or hub (e.g., Amazon Alexa, Google Home, Z-wave controller, etc.), etc. In one specific example, a smart phone may include an application ("app") that allows a user to select from one or more predefined colors and/or predefined patterns for a fiber or fabric. In another example, the app on the smart phone may allow the user to design a custom pattern. The smart phone may then communicate with the controller 510 responsible for controlling the fiber/fabric, such as by wirelessly transmitting a signal to a receiver associated with the controller 510, after which the electrical current may be provided to one or more fibers to effect the color change as discussed in more detail herein.

As an example, an article of clothing or another product incorporating color-changing fibers may normally exhibit a first color (e.g., purple, green, etc.) in a first state, and a user may select a second, different color (e.g., red, yellow, etc.) using the input device 530, which in turn sends a signal to the controller 510 to turn the fabric from the first color to the second color such that the fabric is in a second state that differs from the first state (see, e.g., FIGS. 23 and 24). As another example, the user may select a pattern such as "stripe" in the smart phone app (e.g., by selecting a "stripe" button, etc.), and various portions of the fabric may change from the first color to a striped pattern (e.g., blue stripes in the purple fabric, by selectively changing the temperature of certain fibers in the fabric to effect the striped pattern, etc.) (see, e.g., FIGS. 25 and 26). The input device 530 may therefore allow the user to determine when a color change occurs and/or what pattern appears on the color-changing product 400.

As shown in FIG. 33, in some embodiments, the color-changing product 400 includes one or more sensors (e.g., sensors to measure temperature, force, pressure, acceleration, moisture, etc.), shown as sensors 492. In one embodiment, the sensors 492 include a piezoelectric sensor that is configured to sense a depressive force or pressure on the fabric that the color-changing fibers 10 and/or the color-changing yarns 100 are included with. The piezoelectric sensor may be incorporated directly into the fabric of the color-changing product 400 and/or in a patch coupled to the fabric of the color-changing product 400. The piezoelectric sensors may send an electrical signal to controller 510 in response to detecting a depressive force and the controller 510 may take an appropriate action in response to the signal (e.g., command the power supply 520 to provide electrical current to the color-changing fibers 10 to activate the thermochromic pigment to transition the color, pattern, etc.).

Figure 34:
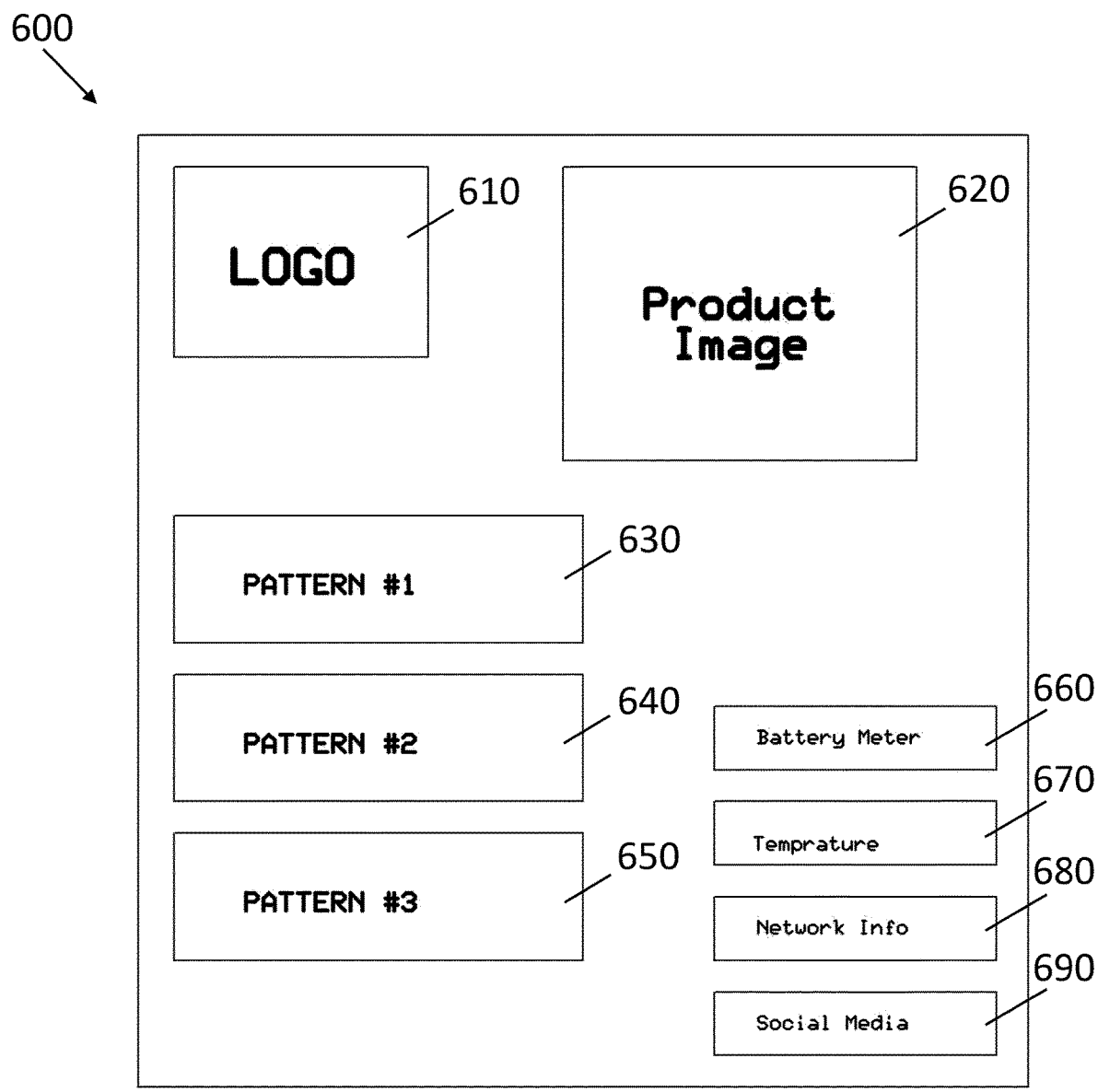
FIG. 34 is a schematic diagram of a graphical user interface of an application provided by an input device, according to an exemplary embodiment.

According to the exemplary embodiment shown in FIG. 34, a graphical user interface, shown as GUI 600, is provided to a user via the input device 530 (e.g., on a display thereof, etc.) through an app stored thereon or a program accessed thereby. As shown in FIG. 34, the GUI 600 has a logo button 610, a product image section 620, a first pattern button 630, a second pattern button 640, a third pattern button 650, a battery meter button 660, a temperature button 670, a network information button 680, and a social media button 690. In other embodiments, the GUI 600 provides more, fewer, or different buttons or sections. The logo button 610 may facilitate selectively manipulating the visual appearance (e.g., color, pattern, etc.) of a logo or embroidered portion (e.g., the embroidered portion 462, the embroidered portion 472, etc.) of the color-changing product 400. The product image section 620 may visually depict how the color-changing product 400 currently looks or provide a visual rendering of what the color-changing product 400 may look like following confirmation of a command to change a color and/or a pattern of the color-changing product 400 (e.g., via the logo button 610, the first pattern button 630, the second pattern button 640, the third pattern button 650, etc.).

The first pattern button 630, the second pattern button 640, and/or the third pattern button 650 may facilitate selectively manipulating the color and/or pattern of the color-changing product 400. By way of example, the first pattern button 630 may be associated with a first predefined pattern (e.g., a striped pattern, a checkered pattern, etc.), the second pattern button 640 may be associated with a second predefined pattern (e.g., a gradient color pattern, etc.), and the third pattern button 650 may be associated with a third predefined pattern (e.g., a solid color pattern, etc.). In some embodiments, the patterns associated with the first pattern button 630, the second pattern button 640, and/or the third pattern button 650 are selectively set by the user (e.g., downloadable, chosen from a larger list, etc.) and/or selectively customizable. In some embodiments, the GUI 600 provides fewer or more than three pattern options (e.g., two, four, five, etc. selectable patterns).

The battery meter button 660 may facilitate selectively presenting a battery status or power level of the power supply 520 or the PV source 490 to the user of the input device 530 (e.g., upon selection by the user, etc.). The temperature button 670 may facilitate selectively presenting a temperature setting and/or a current temperature of the color-changing product 400 or various individual portions thereof to the user of the input device 530 (e.g., upon selection by the user, etc.). The network information button 680 may facilitate (i) selectively connecting the input device 530 to a respective color-changing product 400 (i.e., the controller 510 thereof) and/or (ii) selectively presenting network connection information to the user of the input device 530 (e.g., upon selection by the user, etc.) regarding communication between (a) the input device 530 and (b) the controller 510 (e.g., communication protocol type, connection strength, an identifier of the color-changing product 400 connected to the input device 530, etc.) and/or an external network (e.g., communication protocol type, connection strength, etc.). The social media button 690 may facilitate linking the app on the input device 530 to the user's social media account(s) (e.g., Facebook, Instagram, Snapchat, Twitter, etc.). Such linking may allow the user to share the patterns they have generated with their peers and/or facilitate downloading patterns generated by others via their social media account.

These examples are not intended as limiting but are provided merely to provide certain non-exclusive examples of how fabrics incorporating the color-changing fibers 10 disclosed herein may be controlled by a user. It should be noted that although the aforementioned examples contemplate the use of a wireless electronic device such as a smart phone to communicate with and change the color and/or pattern of a fabric and/or an individual fiber, any of a variety of other types of controllers may be used to control the color and/or pattern of a fabric, and may employ wired or wireless communications connections, and may use any useful wired or wireless communications protocols that are now known or that may be hereafter developed. The color and/or pattern changes may be manually activated at a desired time by a user or may be programmed to occur (or not occur) at defined times and/or intervals in the future. In some embodiments, the controller 510 is configured to activate at least a portion of the color-changing fibers 10 in response to the smartphone receiving a notification (e.g., a text message, an email, a call, etc.). The type of activation (e.g., color, pattern, etc.) or portion of the color-changing product 400 that is activated may correspond with the type of notification or the cause of such notification (e.g., the person texting, emailing, calling, etc.). The controller 510 may allow for programming of such timer settings and/or notifications using any of a variety of possible programming methods, all of which are intended to fall within the scope of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fibers, yarns, fabrics, and end products as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A method of manufacturing a color-changing fiber product, the method comprising:
   coating an electrically conductive core with a first molten mixture to form an inner coating layer around the electrically conductive core to produce a color-changing fiber; and
   coating the color-changing fiber with a different molten mixture to form an outer coating layer over the inner coating layer;
   wherein the outer coating layer is configured to activate at a first temperature threshold and the inner coating layer is configured to activate at a second temperature threshold that is higher than the first temperature threshold;
   wherein a first temperature at or above the first temperature threshold is configured to cause the outer layer to transition from an opaque state to an at least partially transparent state to expose the inner coating layer; and
   wherein a second temperature at or above the second temperature threshold is configured to cause the inner coating layer to transition from a first opaque state to at least one of a second, different opaque state or a third, at least partially transparent state.

2. The method of claim 1, further comprising:
   loading a polymeric material and a first thermochromic pigment material into a fiber fabrication machine that comprises an extruder, a melt pump, and a spinneret, wherein the polymeric material and the first thermochromic pigment material are provided as (a) a first raw material comprising the polymeric material and a second raw material comprising the first thermochromic pigment material or (b) a thermochromic pigment and polymer mixture;
   operating the extruder to provide the first molten mixture of the polymeric material and the first thermochromic pigment material to the melt pump;
   providing a volume of the first molten mixture to the spinneret with the melt pump;
   operating the spinneret to collapse the first molten mixture onto the electrically conductive core as the electrically conductive core moves through a housing of the spinneret to coat the electrically conductive core with the first molten mixture to form the inner coating layer around the electrically conductive core to produce the color-changing fiber.

3. The method of claim 2, wherein the fiber fabrication machine includes a single hopper and a single extruder that receive the polymeric material and the first thermochromic pigment material.

4. The method of claim 2, further comprising at least one of:
   (i) controlling the volume of the first molten mixture provided to the spinneret to provide the inner coating layer on the electrically conductive core with a desired thickness;
   (ii) controlling a speed at which the electrically conductive core is driven through the spinneret to provide the inner coating layer on the electrically conductive core with the desired thickness;
   (iii) quenching the color-changing fiber after coating the electrically conductive core with the first molten mixture; or
   (iv) winding the color-changing fiber onto a spool.

5. The method of claim 2, wherein the electrically conductive core is a prefabricated wire, and the method further comprises providing the prefabricated wire to the spinneret and feeding the prefabricated wire through the housing of the spinneret.

6. The method of claim 2, wherein the fiber fabrication machine includes a core delivery system, and the method further comprises:
   loading the core delivery system with raw core materials;
   operating the core delivery system to (i) melt the raw core materials into molten core materials and (ii) provide the molten core materials to the spinneret, wherein the spinneret is a bicomponent melt extrusion pack configured to co-extrude the molten core materials and the first molten mixture in the form of the color-changing fiber; and
   operating the spinneret to generate the electrically conductive core within the housing of the spinneret from the molten core materials and collapse the first molten mixture onto the electrically conductive core formed from the molten core materials as the electrically conductive core moves through the housing.

7. The method of claim 2, wherein the fiber fabrication machine includes (i) a first hopper and a first extruder that receive the polymeric material and (ii) a second hopper and a second extruder that receive the first thermochromic pigment material.

8. The method of claim 1, wherein the electrically conductive core comprises a metallic or non-metallic electrically conductive material.

9. The method of claim 1, further comprising braiding the color-changing fiber with a second fiber to provide a color-changing yarn.

10. The method of claim 9, wherein the second fiber is the same as the color-changing fiber.

11. The method of claim 9, wherein the second fiber is a non-color-changing fiber including at least one of a natural fiber, a synthetic fiber, or a photovoltaic fiber.

12. The method of claim 9, wherein the second fiber includes a third coating layer that at least one of has a different thermochromic pigment material or has a different polymeric material than the inner coating layer or the outer coating layer of the color-changing fiber.

13. The method of claim 1, further comprising:
   (i) weaving or knitting the color-changing fiber to form at least a portion of a fabric;
   (ii) embroidering the color-changing fiber into a pre-existing fabric; or
   (iii) arranging the color-changing fiber into a patch and coupling the patch to the pre-existing fabric.

14. The method of claim 13, wherein the patch includes a first patch and a second patch, wherein the first patch is configured to be controllable to transition the first patch from displaying a first word to a second, different word, and wherein the second patch is configured to be controllable to transition the second patch from displaying a first number to a second, different number.

15. A method of manufacturing a color-changing product, the method comprising:
   manufacturing a plurality of color-changing fibers including:
      loading a polymeric material and a thermochromic pigment material into a fiber fabrication machine that includes an extruder, a melt pump, and a spinneret;
      operating the extruder to provide a first molten mixture of the polymeric material and the thermochromic pigment material to the melt pump;
      providing a volume of the molten mixture to the spinneret with the melt pump; and
      operating the spinneret to coat an electrically conductive core with an inner coating layer of the first molten mixture to provide a color-changing fiber;
      coating the color-changing fiber with a second molten mixture to form an outer coating layer over the inner coating layer, wherein the outer coating layer is configured to activate at a first temperature threshold and the inner coating layer is configured to activate at a second temperature threshold that is higher than the first temperature threshold, wherein a first temperature at or above the first temperature threshold is configured to cause the outer layer to transition from an opaque state to an at least partially transparent state to expose the inner layer, and wherein a second temperature at or above the second temperature threshold is configured to cause the inner layer to transition from a first opaque state to at least one of a second, different opaque state or a third, at least partially transparent state;
   arranging the plurality of color-changing fibers to provide at least a portion of a color-changing product; and
   ultrasonically welding at least a sub-portion of the portion to form a weld that electrically connects the electrically conductive core of two or more of the plurality of color-changing fibers through the coatings thereof.

16. The method of claim 15, wherein at least one of the plurality of color-changing fibers is different from the others of the plurality of color-changing fibers.

17. The method of claim 15, wherein arranging the plurality of color-changing fibers to provide at least the portion of the color-changing product includes:
   (i) weaving or knitting the plurality color-changing fibers to form at least a portion of a fabric of the color-changing product; or
   (ii) embroidering the plurality of color-changing fibers into the fabric of the color-changing product.

* * * * *